US012614422B2

(12) United States Patent
Trapani et al.

(10) Patent No.: US 12,614,422 B2
(45) Date of Patent: Apr. 28, 2026

(54) WIRELESS LOCKOUT-TAGOUT STATE MACHINE-BASED ACCESS CONTROL SYSTEM AND METHOD

(71) Applicant: Security Enhancement Systems, LLC, Northbrook, IL (US)

(72) Inventors: Matthew Frank Trapani, Deerfield, IL (US); Anthony Mark Williams, Northbrook, IL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 413 days.

(21) Appl. No.: 18/131,487

(22) Filed: Apr. 6, 2023

(65) Prior Publication Data

US 2023/0334926 A1     Oct. 19, 2023

Related U.S. Application Data

(60) Provisional application No. 63/328,243, filed on Apr. 6, 2022.

(51) Int. Cl.
*G06Q 20/32* (2012.01)
*F16P 3/08* (2006.01)
(Continued)

(52) U.S. Cl.
CPC ............ *G07C 9/00896* (2013.01); *F16P 3/08* (2013.01); *G07C 9/00817* (2013.01)

(58) Field of Classification Search
CPC ... F16P 3/08; G07C 9/00817; G07C 9/00896; G07C 9/00182; G07C 9/00571; G07C 2009/00793; G07C 9/00309; G07C 9/0069; G07C 9/00912; G07C 9/33; G07C 2009/00634; G07C 2009/00785; G07C 9/00563; G07C 9/28; G07C 2209/62;
(Continued)

(56) References Cited

U.S. PATENT DOCUMENTS 7,467,400 B1     12/2008   Moss et al.
2002/0180582 A1   12/2002   Nielsen
(Continued)

OTHER PUBLICATIONS

International Search Report, International application No. PCT/US23/17703. Date of mailing: Aug. 4, 2023. ISA/US, Alexandria, VA.

(Continued)

*Primary Examiner* — Dionne Pendleton
(74) *Attorney, Agent, or Firm* — Gregory Finch; Finch Paolino, LLC

(57) ABSTRACT

A wireless lockout-tagout state machine-based access control system and method. Embodiments of the present disclosure provide for an electronic access control system that utilizes state machine-based single or multiple access codes to enable context-dependent or context-specific user-access permissions for different access points within an access-controlled area. Each state in the state machine may comprise an access event and a first state can lead to one or more subsequent different states, which may enable a feedback loop back to a past state to ensure a sequence of access events. In certain embodiments, the sequence of access events may be configured to ensure one or more safety protocols or parameters.

13 Claims, 13 Drawing Sheets

(51) Int. Cl.
  G06F 15/16 (2006.01)
  G07C 9/00 (2020.01)

(58) Field of Classification Search
  CPC ........... G07C 2009/00769; G07C 2009/00928; G07C 2209/04; G07C 1/32; G07C 2009/00642; G07C 2009/0092; G07C 9/00174; G07C 9/21; G07C 9/38; G07C 2009/00761; G07C 2009/00825; G07C 2209/63; G07C 9/00944; G07C 9/20; G07C 9/26; G07C 9/27; G07C 2009/00984; G07C 2209/08; G07C 2009/00325; G07C 2009/00317; G07C 2009/00341; G07C 2009/00357; G07C 2009/00587; G07C 2209/64; G07C 9/00658; G07C 9/00857; G07C 9/215; G07C 9/22; G07C 9/29; H04W 12/069; H04W 12/08; H04W 12/33; H04W 12/47; H04W 12/61; H04W 12/63; H04W 12/65; H04W 12/082; H04W 4/80; H04W 52/0219; H04W 52/0251; H04W 84/12; H04W 12/50; H04W 76/10; H04W 84/18; H04W 12/04; H04W 12/041; H04W 12/062; H04W 12/065; H04W 12/068; H04W 12/37; H04W 12/71; H04W 4/021; H04W 4/023; H04W 4/40; H04W 76/14; H04M 1/724095; H04M 1/72457; H04M 1/724631; G06Q 20/321; G06Q 20/3227; G06Q 10/087; G06Q 50/265; G06Q 10/02; G06Q 20/045; G06Q 20/308; G06Q 20/32; G06Q 20/3223; G06Q 20/3278; G06Q 20/38215; G06Q 20/3829; G06Q 2240/00; G06Q 30/06; G06Q 50/06; G06K 7/0004; G06K 7/10366; G06K 7/10227; G06F 21/629; G06F 21/32; G06F 21/35; G06F 21/44; G06F 2221/2147; Y02D 30/70; E05C 3/042; E05B 1/0092; E05B 17/226; E05B 2047/0024; E05B 39/00; E05B 47/0006; E05B 47/0012; E05B 47/0669; E05B 57/00; E05B 63/0056; E05B 2047/0094; E05B 2047/0095; E05B 47/0001; E05B 47/026; E05B 65/0007; E05B 19/22; E05B 2047/0062; E05B 41/00; E05B 45/06; E05B 47/0038; E05B 55/005; G08C 17/02; G08C 2201/50; G08C 2201/93; G08C 2201/61; G08B 25/008; G08B 21/18; G08B 13/06; G08B 13/08; H04Q 1/00; H04Q 9/00; G07F 7/1008; G07F 7/1025; G07F 15/005; G07F 5/26; Y10T 70/7006; Y10T 70/7062; Y10T 70/7113; Y10T 70/7136; Y10T 70/7051; Y10T 70/7073; Y10T 70/7102; Y10T 70/713; Y10T 70/5155; Y10T 70/7068; Y10T 70/7079; B62H 5/20; B60R 25/102; B60R 25/24; B60R 2325/20; B60R 25/30; B60R 25/01; B60R 25/2081; B60R 25/209; B60R 25/241; B60R 25/34; B60R 2325/101; B60R 2325/108; B60R 2325/205; H04L 63/0428; H04L 2209/24; H04L 2209/80; H04L 2209/84; H04L 67/125; H04L 9/0822; H04L 9/0838; H04L 9/3263; H04L 9/3268; H04L 9/3271; H04L 2209/56; H04L 2209/805; H04L 63/0442; H04L 63/061; H04L 63/0823; H04L 63/083; H04L 63/0861; H04L 63/102; H04L 63/166; H04L 9/0825; H04L 9/0844; H04L 9/0861; H04L 9/0866; H04L 9/0897; H04L 9/14; H04L 9/3013; H04L 9/3066; H04L 9/3226; H04L 9/3234; H04L 9/3247; E05Y 2900/40; F02N 11/0807; F02N 11/106; F02N 2200/025; F02N 2200/0802; F02N 2200/0805; F02N 2200/0814; F02N 2200/0815; F02N 2200/106; F02N 2200/12; F02N 2200/121; F02N 2200/122; F02N 2300/2011; G05B 15/02; Y04S 30/14; Y02T 10/70; Y02T 10/7072; Y02T 10/72; Y02T 90/12; Y02T 90/14; Y02T 90/16; Y02T 90/167; Y02B 20/40; H05B 47/11; H05B 47/14; H04N 9/3155; H04N 9/3167; H01S 5/4012; H01S 5/4093; G05D 1/0022; B64U 10/14; B64U 2201/20; G02B 2027/0118; G02B 26/0833; G02B 27/01; G02B 27/0101; G02B 5/30; B60L 2240/622; B60L 2240/72; B60L 2240/80; B60L 2250/10; B60L 53/16; B60L 53/18; B60L 53/31; B60L 53/57; B60L 53/65; B60L 53/665; B60L 53/68; B60K 2360/23; B60K 2360/25; B60K 2360/27; B60K 2360/31; B60K 2360/334; B60K 2360/77; B60K 35/213; B60K 35/60; B60K 35/80; B60K 35/85

See application file for complete search history.

(56) References Cited

U.S. PATENT DOCUMENTS

| | | | |
|---|---|---|---|
| 2013/0120110 | A1 | 5/2013 | Kalous et al. |
| 2021/0166303 | A1 | 6/2021 | Gideon, III |
| 2021/0256783 | A1 | 8/2021 | Davis et al. |
| 2021/0375082 | A1 | 12/2021 | Wegelin |
| 2022/0159469 | A1* | 5/2022 | Kumakura ............ H04W 12/65 |

OTHER PUBLICATIONS

Written Opinion of the International Searching Authority, International application No. PCT/US23/17703. Date of mailing: Aug. 4, 2023. ISA/US, Alexandria, VA.

* cited by examiner

300a

| Device ID | Input | Current State | Next State | Output |
|---|---|---|---|---|
| $D_1$ | $C_i$ | $S_1$ | $S_2$ | $O_a$ |
| $D_1$ | $I_1$ | $S_2$ | $S_3$ | --- |
| $D_1$ | $I_2$ | $S_3$ | $S_2$ | --- |
| $D_1$ | $I_3$ | $S_2$ | $S_1$ | $O_d$ |
| ⋮ | ⋮ | ⋮ | ⋮ | ⋮ |
| $D_2$ | $I_a$ | $S_a$ | $S_b$ | $O_g$ |
| $D_2$ | $C_i$ | $S_b$ | $S_c$ | $O_h$ |
| $D_2$ | $I_b$ | $S_c$ | $S_a$ | $O_i$ |
| ⋮ | ⋮ | ⋮ | ⋮ | ⋮ |
| $D_3$ | $I_x$ | $S_m$ | $S_n$ | $O_1$ |
| $D_3$ | $C_i$ | $S_n$ | $S_o$ | $O_2$ |
| $D_3$ | $I_y$ | $S_o$ | $S_p$ | $O_3$ |
| $D_3$ | $I_z$ | $S_p$ | $S_m$ | $O_4$ |

FIG.3A

| Device ID | Input | Current State | Next State | Output |
|---|---|---|---|---|
| $D_1$ | $C_1$ | $S_1$ | $S_2$ | $O_a$ |
| $D_1$ | $I_1$ | $S_2$ | $S_3$ | — |
| $D_1$ | $I_2$ | $S_3$ | $S_2$ | — |
| $D_1$ | $I_3$ | $S_2$ | $S_1$ | $O_d$ |
| ⋮ | ⋮ | ⋮ | ⋮ | ⋮ |
| $D_2$ | $I_a$ | $S_a$ | $S_b$ | $O_g$ |
| $D_2$ | $C_2$ | $S_b$ | $S_c$ | $O_h$ |
| $D_2$ | $I_b$ | $S_c$ | $S_a$ | $O_i$ |
| ⋮ | ⋮ | ⋮ | ⋮ | ⋮ |
| $D_3$ | $I_x$ | $S_m$ | $S_n$ | $O_1$ |
| $D_3$ | $C_3$ | $S_n$ | $S_o$ | $O_2$ |
| $D_3$ | $I_y$ | $S_o$ | $S_p$ | $O_3$ |
| $D_3$ | $I_z$ | $S_p$ | $S_m$ | $O_4$ |

300b

*900a*

Generate EAC code(s) for EAC device(s) 1002

Configure state machine model for EAC device(s) 1004

Provide EAC code(s) to client device(s) 1006

Provide EAC code to first EAC device 1008

Determine whether condition(s) are satisfied according to state machine model 1010

If satisfied, grant access to first EAC device 1012

Effect state transition for EAC device(s) according to state machine model 1014

1000

WIRELESS LOCKOUT-TAGOUT STATE MACHINE-BASED ACCESS CONTROL SYSTEM AND METHOD

CROSS-REFERENCE TO RELATED APPLICATIONS

This application claims priority benefit of U.S. Provisional Application Ser. No. 63/328,243, filed Apr. 6, 2022, entitled "WIRELESS LOCKOUT-TAGOUT STATE MACHINE-BASED ACCESS CONTROL SYSTEM AND METHOD"; the entirety of which is hereby incorporated herein at least by virtue of this reference.

FIELD

The present disclosure relates to the field of electronic access control systems; in particular, a wireless lockout-tagout state machine-based access control system and method.

BACKGROUND

Electronic access control systems typically utilize multiple electronic locking devices to secure multiple access points and/or assets (e.g., doors, cabinets, enclosures and the like) within an access-controlled area or site. Electronic access control systems may commonly employ multiple layers of access controls across various access points. Such layers may include granular user permissions within the access-controlled area or site and/or context-dependent or context-specific access permissions within the access-controlled area or site. The concept of configuring context-dependent or context-specific user-access permissions for different access points within an access-controlled area or site is well known in the art. In certain cases, written or verbal procedures are used to instruct technicians and others from not accessing an asset until another dependent operation is complete. However, configuring context-dependent or context-specific user-access permissions within electronic access control systems that utilize electronic mobile devices as a primary modality for providing end-user access keys can be complex, and maintaining multiuser coordination in such systems can prove challenging.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for a system comprising a processor; and a non-transitory computer readable medium communicably engaged with the processor and comprising instructions stored thereon that, when executed, command the processor to perform one or more operations for a wireless lockout-tagout state machine-based access control system and method. In accordance with certain aspects of the present disclosure, the instructions are configured to command the processor to perform one or more operations for generating a plurality of electronic access control codes associated with a plurality of electronic access control devices; configuring each code in the plurality of electronic access control codes according to a state machine model; providing a first code in the plurality of electronic access control codes to a client device; receiving access event data for the first device in the plurality of electronic access control devices; and providing a second code in the plurality of electronic access control codes to the client device. In certain embodiments, the state machine model comprises one or more states, each state in the one or more states corresponding to a lock status for each device in the plurality of electronic access control devices. The state machine model may be configured to configure a condition for each code in the plurality of electronic access control codes according to the one or more states. The state machine model may be configured to effect a first state transition in response to the access event data for the first device. In certain embodiments, the first code may be configured to unlock a first device in the plurality of electronic access control devices according to the state machine model. The second code may be configured to unlock a second device in the plurality of electronic access control devices according to the state machine model and based on the first state transition.

In accordance with certain aspects of the present disclosure, the one or more operations may further comprise operations for receiving access event data for the second device in the plurality of electronic access control devices, wherein the state machine model may be configured to effect a second state transition in response to the access event data for the second device. In certain embodiments, the state machine model is configured to configure each code in the plurality of electronic access control codes as an input in the state machine model. In certain embodiments, the state machine model is configured to enable an action or disable an action for each code in the plurality of electronic access control codes according to the one or more states. In certain embodiments, the one or more operations may further comprise operations for receiving at least one user-generated input from the client device, the at least one user-generated input comprising safety or compliance data corresponding to at least one asset. In certain embodiments, the one or more operations may further comprise operations for processing the safety or compliance data according to the state machine model, wherein the state machine model is configured to effect a second state transition in response to the safety or compliance data. In certain embodiments, the state machine model is configured to disable at least one code in the plurality of electronic access control codes for at least one device in the plurality of electronic access control devices in response to the second state transition.

Further aspects of the present disclosure provide for a method comprising one or more steps or operations for enabling a wireless lockout-tagout state machine-based access control method. In accordance with certain aspects of the present disclosure, the method may comprise one or more steps or operations for generating (e.g., with at least one processor) at least one electronic access control code associated with one or more electronic access control devices. In certain embodiments, the one or more electronic access control devices are configured to selectively grant or restrict access to at least one asset at an access-controlled site. The electronic access control method may further comprise one or more steps or operations for configuring (e.g., with the at least one processor) a state machine model for the one or more electronic access control devices. In certain embodiments, the state machine model comprises one or more states, each state in the one or more states corresponding to a lock status for each device in the one or more electronic access control devices. In certain embodiments, the state machine model is configured to configure at least one condition for the at least one electronic access control code according to the one or more states. The electronic access control method may further comprise one or more steps or operations for providing (e.g., with the at least one processor) the at least one electronic access control code to a client device. The electronic access control method may further comprise one or more steps or operations for providing (e.g., with the client device) the at least one electronic access control code to a first device in the one or more electronic access control devices via a data transfer interface between the client device and the first device. The electronic access control method may further comprise one or more steps or operations for determining whether the at least one condition for the at least one electronic access control code is satisfied according to the state machine model and granting access to the first device in response to determining the at least one condition for the at least one electronic access control code is satisfied. In response to granting access to the first device, the electronic access control method may further comprise one or more steps or operations for effecting (e.g., with the at least one processor) at least one state transition for the one or more electronic access control devices according to the state machine model.

In accordance with certain aspects of the present disclosure, the electronic access control method may further comprise one or more steps or operations for providing (e.g., with the client device) the at least one electronic access control code to a second device in the one or more electronic access control devices. The electronic access control method may further comprise one or more steps or operations for determining whether the at least one condition for the at least one electronic access control code is satisfied in response to the at least one state transition. The electronic access control method may further comprise granting access to the second device in response to determining the at least one condition for the at least one electronic access control code is satisfied or denying access to the second device in response to determining the at least one condition for the at least one electronic access control code is not satisfied. The electronic access control method may further comprise one or more steps or operations for receiving (e.g., with the client device) at least one user-generated input comprising safety or compliance data corresponding to the at least one asset. The one or more steps or operations may further comprise effecting (e.g., with the at least one processor) at least one second state transition for the one or more electronic access control devices according to the state machine model in response to the safety or compliance data. The one or more steps or operations may further comprise effecting (e.g., with the at least one processor) at least one second state transition for the one or more electronic access control devices according to the state machine model in response to granting access to the second device.

Still further aspects of the present disclosure provide for a system comprising a processor; and a non-transitory computer readable medium communicably engaged with the processor and comprising instructions stored thereon that, when executed, command the processor to perform one or more operations for a wireless lockout-tagout state machine-based access control system and method. In accordance with certain aspects of the present disclosure, the one or more operations may comprise operations for generating at least one electronic access control code associated with one or more electronic access control devices, wherein the one or more electronic access control devices are configured to selectively grant or restrict access to at least one asset at an access-controlled site; configuring a state machine model for the one or more electronic access control devices; providing the at least one electronic access control code to a client device; receiving access event data for a first device in the one or more electronic access control devices; and effecting at least one state transition in the state machine model in response to the access event data for the first device. In accordance with certain aspects of the present disclosure, the at least one electronic access control code may comprise at least one input in the state machine model. The state machine model may comprise one or more states, each state in the one or more states corresponding to a status of the one or more electronic access control devices. The state machine model may be configured to configure at least one condition for the at least one electronic access control code according to the one or more states. In certain embodiments, the at least one electronic access control code is configured to unlock a first device in the one or more electronic access control devices according to the state machine model. The state machine model may be configured to enable the at least one electronic access control code to unlock at least one second device in the one or more electronic access control devices based on the at least one state transition.

In accordance with certain aspects of the present disclosure, the one or more operations may further comprise operations for receiving access event data for the at least one second device. The one or more operations may further comprise effecting at least one second state transition in the state machine model in response to the access event data for the at least one second device. The at least one second state transition may comprise a return to a prior state or a transition to a sequential state in the state machine model. The one or more operations may further comprise receiving safety or compliance data associated with the at least one asset. The one or more operations may further comprise one or more operations further comprise processing the safety or compliance data according to the state machine model, wherein the state machine model is configured to effect at least one second state transition in response to the safety or compliance data. In certain embodiments, the state machine model is configured to disable the at least one electronic access control code for at least one device in the one or more electronic access control devices in response to the at least one second state transition.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative descriptions with reference to the following drawings in which:

FIGS. 3A-3B are illustrative state transition tables of a state machine-based electronic access control system, in accordance with certain aspects of the present disclosure;

DETAILED DESCRIPTION

Figure 1:
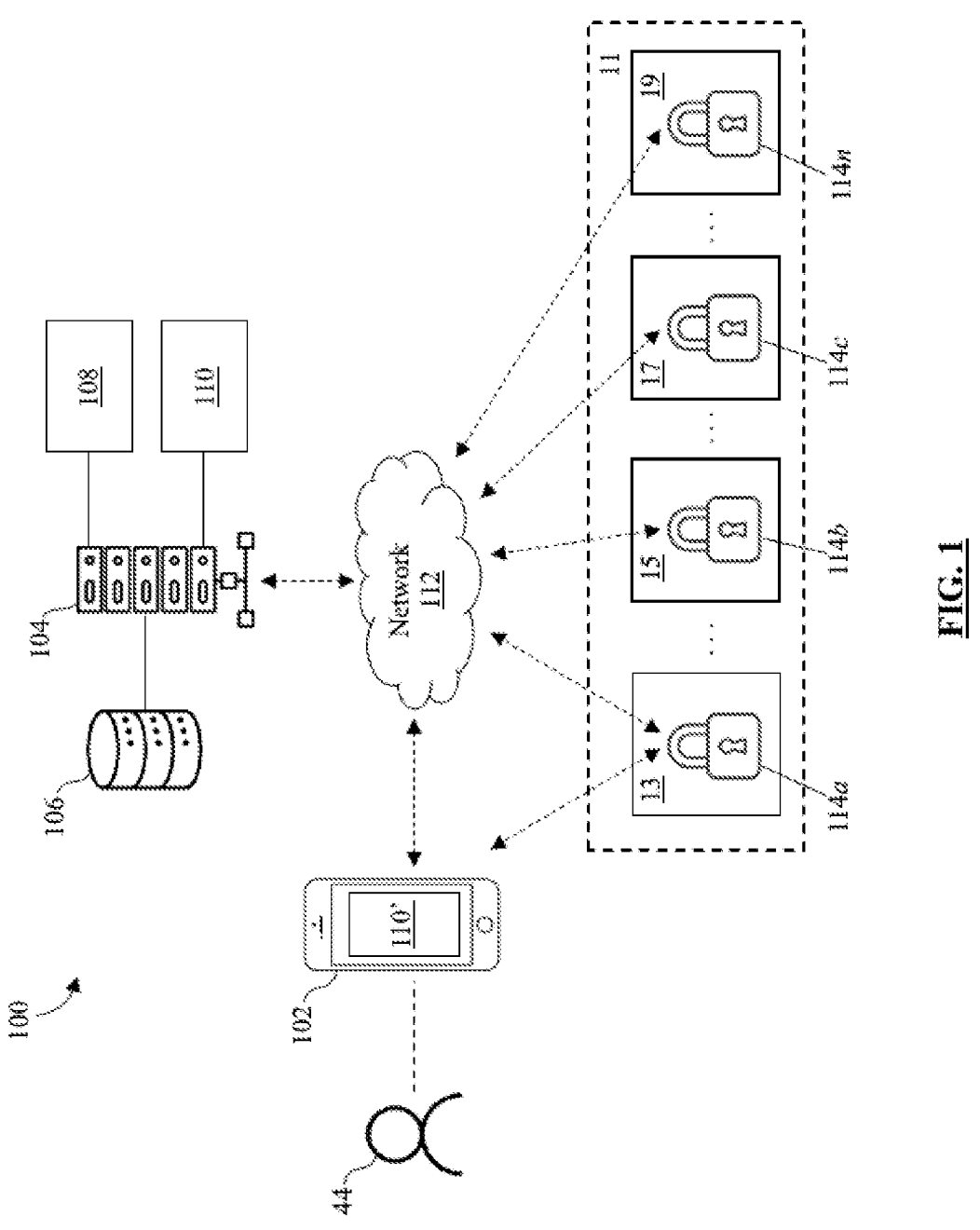
FIG. 1 is an architecture diagram of a state machine-based electronic access control system, in accordance with certain aspects of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Descriptions of well-known starting materials, processing techniques, components and equipment are omitted so as not to unnecessarily obscure the invention in detail. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. All definitions, as defined and used herein, should be understood to control over dictionary definitions, definitions in documents incorporated by reference, and/or ordinary meanings of the defined terms.

Following below are more detailed descriptions of various concepts related to, and embodiments of, inventive methods, devices and systems including a wireless lockout-tagout state machine-based electronic access control system and method that utilizes state machine-based single or multiple access codes to enable context-dependent or context-specific user-access permissions for different access points within an access-controlled area. In accordance with certain aspects of the present disclosure, one or more state machine-based single or multiple access codes are linked to one or more components of single or multiple assets. In certain exemplary embodiments, each state is configured as an access event and a first state can lead to one or more subsequent states, which may enable a feedback loop back to a past state to ensure a sequence of access events. In certain embodiments, the sequence of access events may be configured to ensure one or more safety protocols or parameters. In accordance with certain aspects of the present disclosure, if an access attempt is made out of sequence, the access code will not work. In certain embodiments, an electronic lock is configured to comply with the state machine. The electronic lock may be configured to store, in memory, a current state and an allowable subsequent state based on the current state.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof. The term "interface" may be further defined as any shared boundary or connection between two dissimilar objects, devices or systems through which information or power is passed and/or a mechanical, functional and/or operational relationship is established and/or accomplished. Such shared boundary or connection may be physical, electrical, logical and/or combinations thereof.

As used herein, the term "packet" refers to any formatted unit of data that may be sent and/or received by an electronic device.

As used herein, the term "payload" refers to any part of transmitted data that constitutes an intended message and/or identifying information.

As used herein, the term "access control system" or "electronic access control system" refers to any system for restricting entrance to a property, a building, an area, a container, and/or a room to authorized persons through the use of at least one electronic access control device.

As used herein, the term "electronic access control device" or "access control device" refers to any electronic device that may be a component of an access control system, including: an access control panel (also known as a controller); an access-controlled entry, such as a door, turnstile, parking gate, elevator, or other physical barrier; a reader installed near the entry/exit of an access-controlled area; locking hardware, such as electric door strikes, electromagnetic locks, and electronically-actuated mechanical locks; magnetic door switches for monitoring door position; and request-to-exit (REX) devices for allowing egress.

As used herein, the term "advertising" or "advertisement" refers to any transmitted packet configured to establish a data transfer interface between two electronic devices. An "advertising" or "advertisement" may include, but is not limited to, a BLE advertising packet transmitted by a peripheral device over at least one BLUETOOTH advertisement channel.

As used herein, the term "signal" refers to any electromagnetic or electrical current that carries data from one electrical component of a system or apparatus to another or from one system or network to another.

As used herein, the term "command signal" refers to any signal that carries data configured to command, actuate, instantiate and/or instruct one or more action or operation by one or more electrical component of a system or apparatus.

As used herein, the term "state machine" refers to a behavior model within an electronic access control system that is configured to process a given input according to a current state and perform a state transition and produce an output. In accordance with various aspects of the present disclosure, a state machine may comprise a finite number of states and may also be referred to as a finite-state machine (FSM). In accordance with various aspects of the present disclosure, a state machine may be defined wholly in a virtual environment and may also be referred to as a virtual finite-state machine (VFSM). A VFSM may provide a software specification method to describe the behavior of an electronic access control system using assigned names of input control properties and output actions. A VFSM method may comprise an execution model of an electronic access control system configured to facilitate one or more executable specification.

As used herein, the term "state" refers to a description of the status of a system that is waiting to execute a transition including at least one action or a set of actions to be executed when a condition is fulfilled or when an event is received.

Certain objects and advantages of the present disclosure include a wireless lockout-tagout state machine-based access control system and method that utilizes state machine-based single or multiple access codes to increase user compliance with one or more safety protocols or parameters and improve user safety at an access-controlled site.

Certain objects and advantages of the present disclosure include a wireless lockout-tagout state machine-based access control system and method configured to define relationships between multiple access control accounts and digital access codes.

Certain objects and advantages of the present disclosure include a wireless lockout-tagout state machine-based access control system configured to assign a set of dependent (i.e., linked) EAC codes (or a single EAC code) configured to conditionally access one or more electronic access control devices within a group or sub-group of assets in series (i.e., sequentially) after another code has been used for a different asset in the group or sub-group of assets.

Certain exemplary embodiments of the present disclosure provide for a wireless lockout-tagout state machine-based access control system and method that utilizes state machine-based single or multiple access codes to enable context-dependent or context-specific user-access permissions for different access points within an access-controlled area. In accordance with certain aspects of the present disclosure, one or more state machine-based single or multiple access codes are linked to one or more components of single or multiple assets (i.e., electronic access control device(s)). In certain exemplary embodiments, each state is configured as an access event and a first state can lead to one or more subsequent different states, which may enable a feedback loop back to a past state to ensure a sequence of access events. In certain embodiments, the sequence of access events may be configured to ensure one or more safety protocols or parameters. In accordance with certain aspects of the present disclosure, if an access attempt is made out of sequence, the asset will deny access (i.e., the code will not work). In certain embodiments, an electronic access control device (e.g., electronic locking device) is configured to comply with the state machine. The electronic access control device may be configured to store, in memory, a current state and an allowable subsequent state based on the current state.

Turning now descriptively to the drawings, in which similar reference characters denote similar elements throughout the several views, FIG. 1 depicts an architecture diagram of a state machine-based electronic access control system 100. In accordance with certain aspects of the present disclosure, system 100 is configured to define, manage and administer one or more relationships between/across multiple authorized users, electronic access control (EAC) codes and EAC devices according to a state machine model. In certain embodiments, system 100 is configured to generate a set of linked EAC codes wherein each EAC code is configured to access a single asset or a sub-set of assets in series after another EAC code has been used for a different part of the asset(s) and vice versa. In certain embodiments, system 100 is configured to configure a plurality of conditions within a state machine model wherein a single EAC code is configured to conditionally access two or more EAC devices at different time points according to a defined access sequence. In accordance with certain aspects of the present disclosure, system 100 comprises a networked server 104, an EAC database 106, at least one client device 102 and a plurality of EAC devices 114*a-n*. Client device 102 may comprise a smart phone, tablet computer, and/or other mobile electronic device, including passive devices such as RF-enabled key fobs. Plurality of EAC devices 114*a-n* may be operably configured to selectively secure and restrict access to one or more assets 13,15,17,19 within a secure site 11. For example, secure site 11 might comprise a cell tower site and assets 13,15,17,19 might comprise one or more cabinets housing various equipment for the cell tower site. In certain embodiments, networked server 104, client device 102 and EAC devices 114*a-n* may be communicably engaged via a network interface 112. Client device 102 may be communicably engaged with one or more of EAC devices 114*a-n* via a wireless data transfer interface (e.g., BLU-ETOOTH).

In accordance with certain aspects of the present disclosure, server 104 may comprise a state machine engine 108 and an application engine 110 executing thereon. Application engine 110 may comprise software configured to command and execute a plurality of operations of an EAC platform and application within system 100. For example, the plurality of operations may include, but are not limited to, operations for managing and authenticating one or more authorized users and/or user roles within system 100, providing an application instance 110' of the EAC application to client device 102, generating and managing one or more EAC codes to command one or more operations of EAC devices 114*a-n*, and configuring and/or managing EAC devices 114*a-n* and/or provisioning one or more operations thereof. State machine engine 108 may comprise software configured to command and execute a plurality of operations of a virtual finite state machine within system 100. In accordance with certain aspects of the present disclosure, state machine engine 108 may be configured to configure a state machine model comprising one or more inputs, states, transition conditions, and outputs for each of EAC devices 114*a-n*.

In accordance with certain aspects of the present disclosure, a user 44 of system 100 may launch application instance 110' at client device 102 and application engine 110 may instantiate the instance of the EAC application at server 104. Application instance 110' may comprise a graphical user interface configured to enable user 44 to execute one or more commands for one or more of EAC devices 114*a-n*. In accordance with certain embodiments, user 44 may execute an access request for a first EAC device 114*a*. The access request may comprise providing a first EAC code to the first EAC device 114*a* via the wireless data transfer interface between client device 102 and first EAC device 114*a*. In accordance with certain aspects of the present disclosure, first EAC device 114*a* may process the access request according to the state machine model. In certain embodiments, first EAC device 114*a* may comprise a local finite state machine configured to transition first EAC device 114*a* between at least a first state and a second state. Alternatively, or additionally, first EAC device 114*a* may be configured to execute at least one server call to server 104 in response to the access request. In said embodiments, state machine engine 108 may be configured to process the access request according to the state machine model to approve or deny the access request. In accordance with certain aspects of the present disclosure, first EAC device 114*a* may be configured to grant the access request (i.e., actuate at least one locking mechanism of first EAC device 114*a* from a locked state to an unlocked state) wherein the first EAC code comprises a valid input in the state machine model and deny the access request (i.e., retain first EAC device 114*a* in the locked state) wherein the EAC code comprises an invalid input in the state machine model. In accordance with certain embodiments, first EAC device 114*a* may be configured to communicate access event data (e.g., a lock status of first EAC device 114*a*) to server 104 in response to processing the access request. State machine engine 108 may be configured to process the access event data to effect one or more state transition in the state machine model for first EAC device 114*a* and/or one or more of EAC devices 114*b-n*. In accordance with certain embodiments, user 44 may execute a second or subsequent access request at one or more of EAC devices 114*b-n*. System 100 may be configured to process the second or subsequent access request (i.e., approve or deny the request) according to the one or more state transition in the state machine model.

Figure 2:
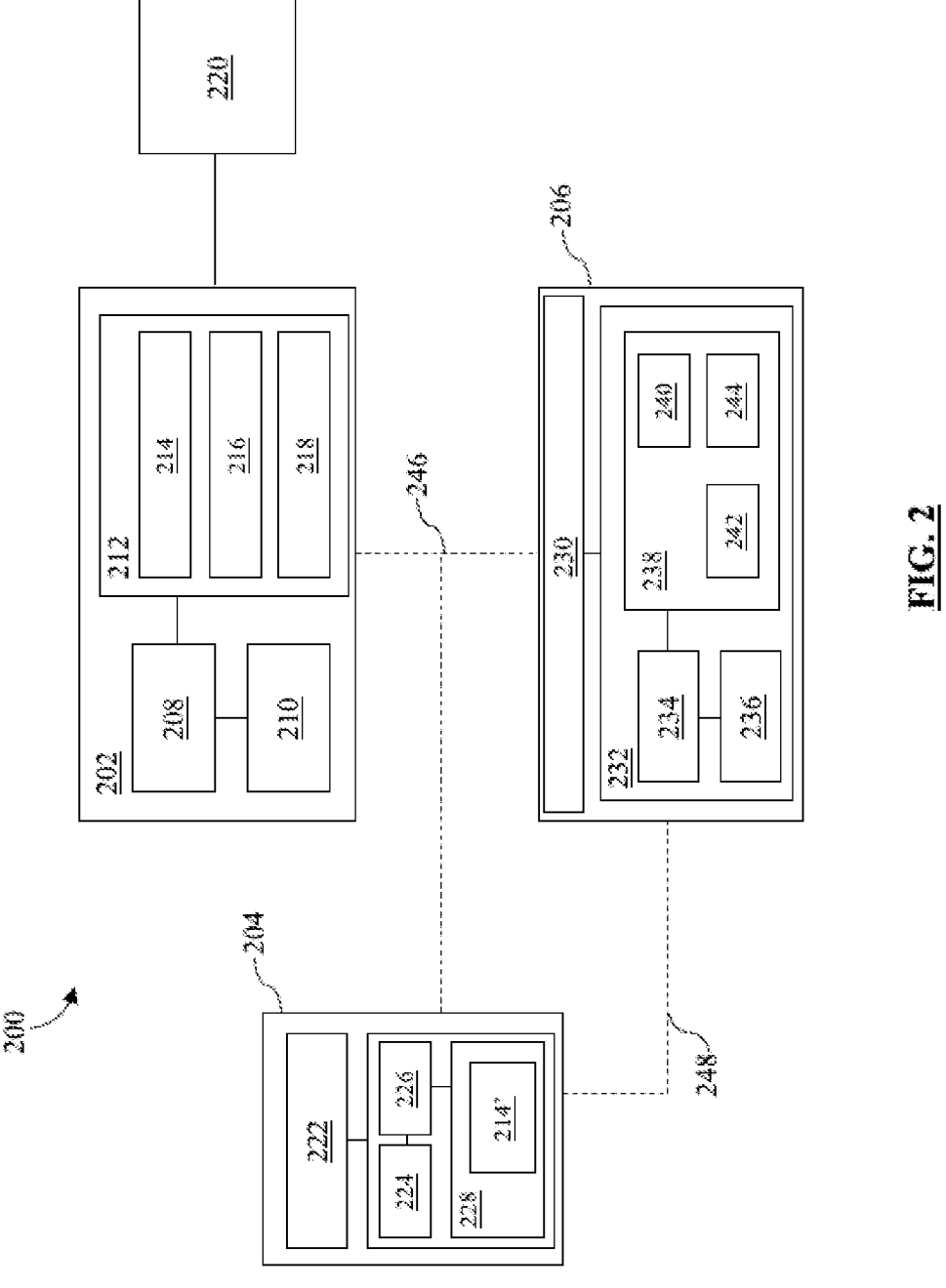
FIG. 2 is a functional block diagram of a state machine-based electronic access control system, in accordance with certain aspects of the present disclosure.

Referring now to FIG. 2, a system diagram of a state machine-based electronic access control system 200 is shown. In accordance with certain aspects of the present disclosure, system 200 may comprise an embodiment of system 100, as shown in FIG. 1. System 200 may comprise a server 202, a client device 204, an EAC device 206, and a database 220. In accordance with certain aspects of the present disclosure, server 202 may comprise an embodiment of server 104, in FIG. 1; client device 204 may comprise an embodiment of client device 102, in FIG. 1; EAC device 206 may comprise an embodiment of one or more of EAC devices 114*a-n*, in FIG. 1; and database 220 may comprise an embodiment of EAC database 106, in FIG. 1. In accordance with certain aspects of the present disclosure, server 202 is communicably engaged with database 220 to store and retrieve EAC device data, access event data, user data and permissions, EAC codes, and other data generated and used in system 200. Server 202, client device 204 and EAC device 206 may be communicably engaged via a network interface 246. Network interface 246 may comprise a wireless and/or wireline communications interface. Client device 204 may be communicably engaged with EAC device 206 via a wireless data transfer interface 248 (e.g., BLU-ETOOTH). In certain embodiments, EAC device 206 may be configured to send a device advertisement to client device 204 via a communications module 236 (e.g., an RF transceiver), and client device 204 may be configured to receive and process at least one data packet from the device advertisement via a communications module 224 (e.g., an RF transceiver), to establish a data transfer interface between EAC device 206 and client device 204 (or vice versa).

In accordance with certain aspects of the present disclosure, server 202 may comprise at least one processor 208, a communications module 210, and at least one memory device 212. Memory device 212 may comprise one or more of an EAC application module 214, an EAC device management module 216, and a state machine module 218. EAC application module 214 may comprise a server-side instance of an EAC application configured to manage one or more user access rights and permissions for one or more EAC devices (e.g., EAC device 206) in system 200. EAC device management module 216 may comprise software for generating one or more EAC codes and managing one or more EAC devices (e.g., EAC device 206) in system 200. State machine module 218 may comprise software for executing a virtual finite state machine comprising at least one state machine module configured to configure, manage and control one or more inputs, states, conditions, state transitions and outputs for one or more EAC devices (e.g., EAC device 206) in system 200. In accordance with certain aspects of the present disclosure, client device 204 may comprise a user interface 222, at least one processor 226, communications module 224 and at least one memory device 228. Memory device 228 may comprise an instance 214' of the EAC application stored thereon and may be communicably engaged with processor 226 to render a graphical user interface of instance 214' at a display of user interface 222.

User interface 222 may comprise at least one input-output (I/O) device configured to receive one or more user-generated inputs from a user of client device 204 via the graphical user interface of instance 214' (e.g., one or more access request). In accordance with certain aspects of the present disclosure, EAC device 206 may comprise at least one electronic locking mechanism 230 (e.g., a mechanical or electromagnetic locking mechanism) configured to selectively secure and restrict at least one access point (e.g., a door or gate) of at least one asset (e.g., an electronics cabinet). EAC device 206 may further comprise a controller 232 communicably engaged with electronic locking mechanism 230 to command electronic locking mechanism 230 between a locked state and an unlocked state. Controller 232 may comprise communications module 234, at least one processor 234 and at least one memory device 238. Memory device 238 may comprise a control module 242 configured to command and control one or more operations of EAC device 206, a data storage module 244 configured to store device activity data/audit log data for EAC device 206, and a state machine module 240 configured to store one or more state-transition tables and effect one or more state transitions for EAC device 206.

Figure 3B:

Referring now to FIGS. 3A-3B, illustrative examples of state-transition tables 300a-b of a state machine-based electronic access control system are shown. The state machine-based electronic access control system may comprise system 100 of FIG. 1 and/or system 200 of FIG. 2. In accordance with certain aspects of the present disclosure, state-transition tables 300a-b are configured/executed via one or more operations of state machine engine 108 of FIG. 1 and/or state machine module 218 of FIG. 2.

In accordance with certain aspects of the present disclosure, state-transition table 300a is an illustrative example of a state-transition table in which a single EAC code (shown as Input $C_1$) is configured to control multiple EAC devices (shown as Device IDs $D_1$, $D_2$, $D_3$) based on two or more interdependent states according to a state machine model. As shown in FIG. 3A, a state machine model may be configured to define the inputs, current states, next states and (optionally) outputs associated with the state transitions for EAC devices $D_1$, $D_2$, $D_3$. In accordance with certain aspects of the present disclosure, state-transition table 300a may comprise a multi-dimensional state-transition table representing communication between separate, interdependent finite-state machines for each of EAC devices $D_1$, $D_2$, $D_3$. In certain embodiments, each of EAC devices $D_1$, $D_2$, $D_3$ may each execute a separate finite-state machine or, alternatively, may comprise separate dimensions of a virtual finite state machine executing on a networked server (e.g., server 104 of FIG. 1). As shown in state-transition table 300a, EAC device $D_1$ may comprise a first state $S_1$ comprising, for example, a locked state. A first input for EAC device $D_1$ may comprise an EAC code, $C_1$. In response to input $C_1$, the state machine model may be configured to execute a state transition for EAC device $D_1$ to a state, $S_2$ comprising, for example, an unlocked state. Output $O_a$ may comprise an output of a controller of EAC device $D_1$ (e.g., controller 238 of FIG. 2) to command a locking mechanism of EAC device $D_1$ (e.g., electronic locking mechanism 230 of FIG. 2) to actuate from a locked position/configuration to an unlocked position/configuration (i.e., to enable access to a first asset, such as asset 13 in FIG. 1).

In accordance with certain aspects of the present disclosure, output $O_a$ may comprise an input $I_a$ for EAC device $D_2$. In certain embodiments, the state machine model may be configured to execute a state transition for EAC device $D_2$ to a state, $S_b$ in response to input $I_a$. State $S_b$ may represent a virtual condition in which EAC device $D_2$ is configured to accept EAC code, $C_1$ as an input. As shown in state-transition table 300a, the state machine model may be configured to execute a state transition for EAC device $D_2$ from a locked state, $S_b$, to an unlocked state, $S_c$, in response to input $C_1$, wherein EAC device $D_2$ is in a starting state, $S_b$. Output $O_h$ may comprise an output of a controller of EAC device $D_2$ (e.g., controller 238 of FIG. 2) to command a locking mechanism of EAC device $D_2$ (e.g., electronic locking mechanism 230 of FIG. 2) to actuate from a locked position/configuration to an unlocked position/configuration (i.e., to enable access to a second asset, such as asset 15 in FIG. 1).

In accordance with certain aspects of the present disclosure, output $O_h$ may comprise an input $I_x$ for EAC device $D_3$. In certain embodiments, the state machine model may be configured to execute a state transition for EAC device $D_3$ to a state, $S_n$ in response to input $I_x$. State $S_n$ may represent a virtual condition in which EAC device $D_3$ is configured to accept EAC code, $C_1$ as an input. As shown in state-transition table 300a, the state machine model may be configured to execute a state transition for EAC device $D_3$ from a locked state, $S_n$, to an unlocked state, $S_o$, in response to input $C_1$, wherein EAC device $D_3$ is in a starting state, $S_n$. Output $O_2$ may comprise an output of a controller of EAC device $D_3$ (e.g., controller 238 of FIG. 2) to command a locking mechanism of EAC device $D_3$ (e.g., electronic locking mechanism 230 of FIG. 2) to actuate from a locked position/configuration to an unlocked position/configuration (i.e., to enable access to a third asset, such as asset 17 in FIG. 1).

In accordance with certain aspects of the present disclosure, state-transition table 300b is an illustrative example of a state-transition table in which a multiple EAC codes (shown as Inputs $C_1$, $C_2$, $C_3$) are configured to control multiple EAC devices (shown as Device IDs $D_1$, $D_2$, $D_3$) based on two or more interdependent states according to a state machine model. As shown in FIG. 3B, a state machine model may be configured to define the inputs, current states, next states and (optionally) outputs associated with the state transitions for EAC devices $D_1$, $D_2$, $D_3$. In accordance with certain aspects of the present disclosure, state-transition table 300b may comprise a multi-dimensional state-transition table representing communication between separate, interdependent finite-state machines for each of EAC devices $D_1$, $D_2$, $D_3$. In certain embodiments, each of EAC devices $D_1$, $D_2$, $D_3$ may each execute a separate finite-state machine or, alternatively, may comprise separate dimensions of a virtual finite state machine executing on a networked server (e.g., server 104 of FIG. 1). As shown in state-transition table 300b, EAC device $D_1$ may comprise a first state $S_1$ comprising, for example, a locked state. A first input for EAC device $D_1$ may comprise an EAC code, $C_1$. In response to input $C_1$, the state machine model may be configured to execute a state transition for EAC device $D_1$ to a state, $S_2$ comprising, for example, an unlocked state. Output $O_a$ may comprise an output of a controller of EAC device $D_1$ (e.g., controller 238 of FIG. 2) to command a locking mechanism of EAC device $D_1$ (e.g., electronic locking mechanism 230 of FIG. 2) to actuate from a locked position/configuration to an unlocked position/configuration (i.e., to enable access to a first asset, such as asset 13 in FIG. 1).

In accordance with certain aspects of the present disclosure, output $O_a$ may comprise an input $I_a$ for EAC device $D_2$. In certain embodiments, the state machine model may be configured to execute a state transition for EAC device $D_2$ to a state, $S_b$ in response to input $I_a$. State $S_b$ may represent a virtual condition in which EAC device $D_2$ is configured to accept a second EAC code, $C_2$ as an input. As shown in state-transition table 300b, the state machine model may be configured to execute a state transition for EAC device $D_2$ from a locked state, $S_b$, to an unlocked state, $S_c$, in response to input $C_2$, wherein EAC device $D_2$ is in a starting state, $S_b$. Output $O_h$ may comprise an output of a controller of EAC device $D_2$ (e.g., controller 238 of FIG. 2) to command a locking mechanism of EAC device $D_2$ (e.g., electronic locking mechanism 230 of FIG. 2) to actuate from a locked position/configuration to an unlocked position/configuration (i.e., to enable access to a second asset, such as asset 15 in FIG. 1).

In accordance with certain aspects of the present disclosure, output $O_h$ may comprise an input $I_x$ for EAC device $D_3$. In certain embodiments, the state machine model may be configured to execute a state transition for EAC device $D_3$ to a state, $S_n$ in response to input $I_x$. State $S_n$ may represent a virtual condition in which EAC device $D_3$ is configured to accept EAC code, $C_3$ as an input. As shown in state-transition table 300b, the state machine model may be configured to execute a state transition for EAC device $D_3$ from a locked state, $S_n$, to an unlocked state, $S_o$, in response to input $C_3$, wherein EAC device $D_3$ is in a starting state, $S_n$. Output $O_2$ may comprise an output of a controller of EAC device $D_3$ (e.g., controller 238 of FIG. 2) to command a locking mechanism of EAC device $D_3$ (e.g., electronic locking mechanism 230 of FIG. 2) to actuate from a locked position/configuration to an unlocked position/configuration (i.e., to enable access to a third asset, such as asset 17 in FIG. 1).

In accordance with certain aspects of the present disclosure, as shown in state-transition table 300a-b, the state machine model may comprise one or more inputs derived from one or more outputs from a separate device. For example, the state machine model may be configured wherein one or more EAC device must be transitioned to a prior state before another device may be transitioned to a prior state. For example, as shown in state-transition table 300a-b, an output $O_h$ of EAC device $D_2$ may comprise an input $I_1$ (i.e., in the form of a virtual condition) for EAC device $D_1$. The state machine model may be configured to execute a state transition for EAC device $D_1$ to a state, $S_3$ in response to input $I_1$. The state machine model may be configured to maintain EAC device $D_1$ in state $S_3$ until receiving an input, $I_2$. An input $I_3$ may comprise a lock command for device $D_1$. The state machine model may be configured to execute a state transition for EAC device $D_1$ from an unlocked state, $S_2$, to a locked state, $S_1$, in response to input $I_3$, wherein EAC device $D_1$ is in a starting state, $S_2$. Output $O_d$ may comprise an output of the controller of EAC device $D_1$ (e.g., controller 238 of FIG. 2) to command a locking mechanism of EAC device $D_3$ (e.g., electronic locking mechanism 230 of FIG. 2) to actuate from an unlocked position/configuration to a locked position/configuration (i.e., to restrict/secure access to the first asset, such as asset 13 in FIG. 1).

Figure 4:
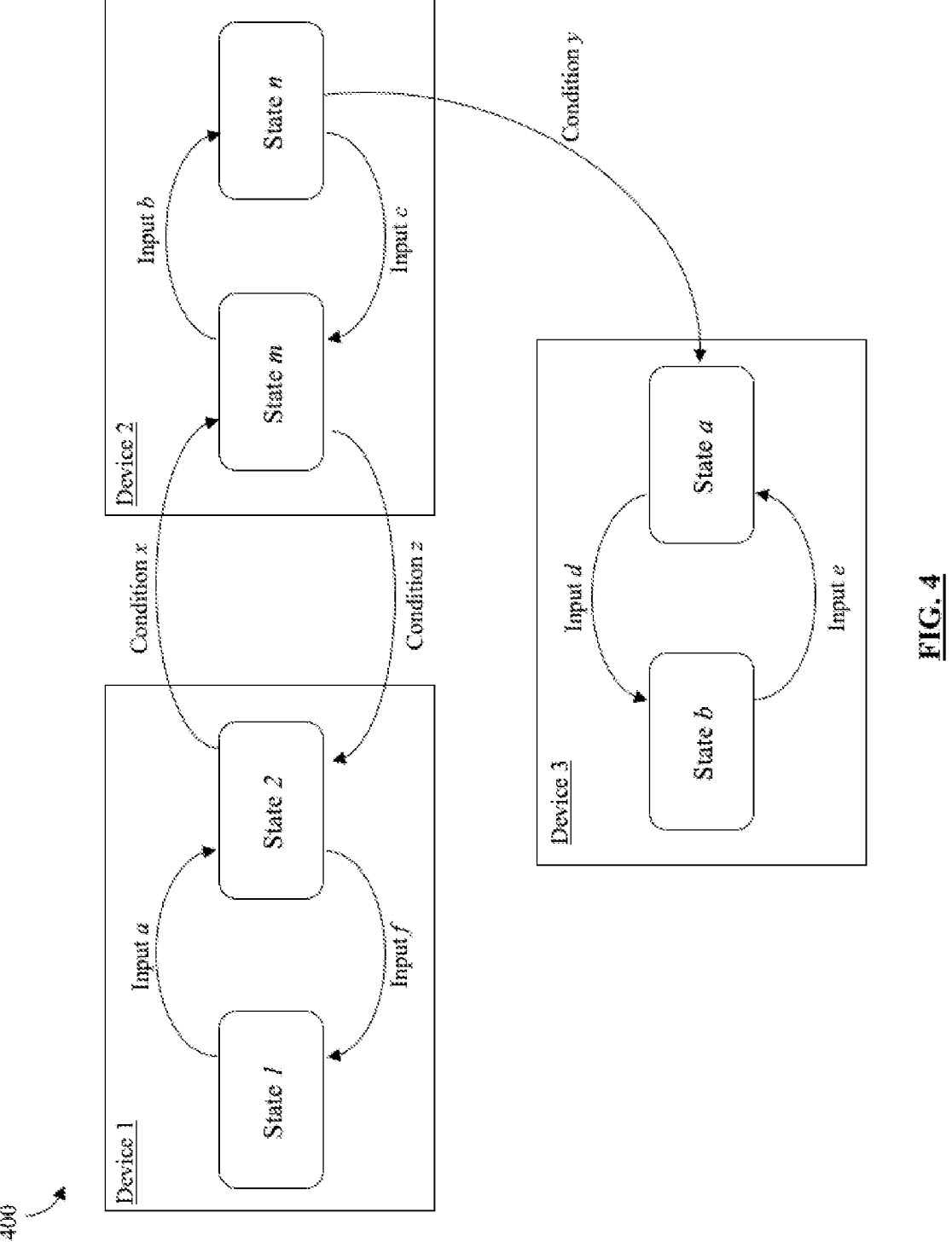
FIG. 4 is a state diagram of a state machine-based electronic access control system, in accordance with certain aspects of the present disclosure.

Referring now to FIG. 4, a state diagram 400 of a state machine-based electronic access control system is shown. State diagram 400 may comprise an alternative representation of state-transition table 300a-b, as shown in FIGS. 3A-3B. The state machine-based electronic access control system may comprise system 100 of FIG. 1 and/or system 200 of FIG. 2. In accordance with certain aspects of the present disclosure, state diagram 400 may be configured/ executed via one or more operations of state machine engine 108 of FIG. 1 and/or state machine module 218 of FIG. 2.

As shown in FIG. 4, state diagram 400 illustrates states, inputs, state transitions, and conditions for a plurality of related EAC devices according to a state machine model. In accordance with certain aspects of the present disclosure, Device 1, Device 2, and Device 3 may comprise separate, interdependent finite-state machines. According to the state machine model, Device 1 may comprise a State 1 and a State 2. An Input a may be configured to effect a state transition between State 1 and State 2. In certain embodiments, Input a may comprise an electronic access control code. State 1 may be associated with a first lock status for Device 1 (e.g., a locked state) and State 2 may be associated with a second lock status for Device 1 (e.g., an unlocked state). State 2 may be associated with an access event for Device 1 (e.g., granting access to at least one asset associated with Device 1) and may represent a Condition x for Device 2 according to the state machine model. Condition x may comprise a virtual condition for Device 2 that must be satisfied in order for Device 2 to effect a state transition from State m to State n in response to receiving an Input b. In certain embodiments, Input b may comprise an EAC code that is the same as that of Input a or a second, unique EAC code. State m may be associated with a first lock status for Device 2 (e.g., a locked state) and State n may be associated with a second lock status for Device 2 (e.g., an unlocked state). State n may be associated with an access event for Device 2 (e.g., granting access to at least one asset associated with Device 2) and may represent a Condition y for Device 3 according to the state machine model. Condition y may comprise a virtual condition for Device 3 that must be satisfied in order for Device 3 to effect a state transition from State a to State b in response to receiving an Input d. In certain embodiments, Input d may comprise an EAC code that is the same as that of Input a or a third, unique EAC code. State a may be associated with a first lock status for Device 3 (e.g., a locked state) and State b may be associated with a second lock status for Device 3 (e.g., an unlocked state).

In accordance with certain aspects of the present disclosure, the state machine model may comprise at least one feedback loop configured to establish a sequence of access events between Device 1, Device 2 and/or Device 3. For example, Device 2 may need to be returned to a prior state (e.g., State m) before Device 1 may be returned to a prior state (e.g., State 1). As shown in state diagram 400, Device 2 may be configured to effect a state transition from State n to State m in response to receiving an Input c. Input c may comprise a lock command entered/received at Device 2. State m may be associated with a lock status for Device 2 (e.g., a locked/armed state for Device 2) and may represent a Condition z for Device 1 according to the state machine model. Condition z may comprise a virtual condition for Device 1 that must be satisfied in order for Device 1 to effect a state transition from State 2 to State 1 in response to receiving an Inputf. Input f may comprise a lock command entered/received at Device 2. State 1 may be associated with a lock status for Device 1 (e.g., a locked/armed state for Device 1).

Figure 5:
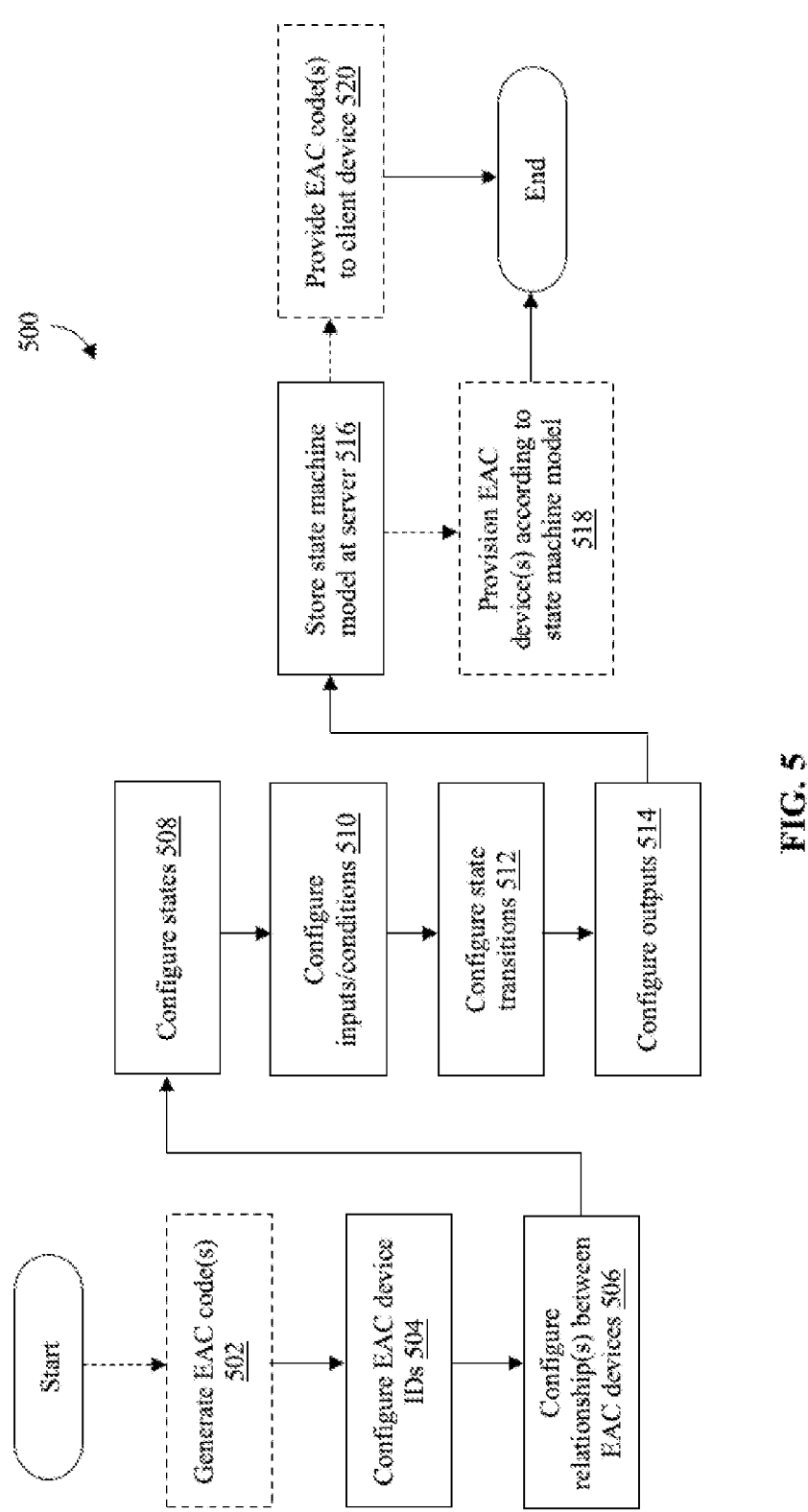
FIG. 5 is a functional block diagram of a routine for configuring a state machine model for a state machine-based electronic access control system.

Referring now to FIG. 5, a functional block diagram of a routine 500 for configuring a state machine model for a state machine-based electronic access control system is shown. In accordance with certain aspects of the present disclosure, the state machine-based electronic access control system may comprise system 100 of FIG. 1 and/or system 200 of FIG. 2. Routine 500 may comprise one or more steps or operations for configuring/implementing state-transition tables 300a-b, as shown in FIGS. 3A-3B, and/or state diagram 400, as shown in FIG. 4. In accordance with certain aspects of the present disclosure, one or more steps or operations of routine 500 may be configured/executed via state machine engine 108 of FIG. 1 and/or state machine module 218 of FIG. 2.

In accordance with certain aspects of the present disclosure, routine 500 may comprise one or more steps or operations 502-520 for configuring and implementing a state machine model within a state machine-based electronic access control system. Routine 500 may, optionally, comprise one or more steps or operations for generating one or more EAC codes for a plurality of EAC devices (Step 502). In certain embodiments, the one or more EAC codes may be generated or otherwise retrieved outside of routine 500. In certain embodiments, one or more EAC codes may comprise a single EAC code that is configured to conditionally control two or more EAC devices or, alternatively, two or more unique EAC codes that each control a separate EAC device according to a state machine model. Routine 500 may proceed by executing one or more steps or operations for configuring identifiers for two or more EAC devices in the state machine model (Step 504). Routine 500 may proceed by executing one or more steps or operations for configuring one or more relationships between the EAC devices in the state machine model (Step 506). The relationships between the EAC devices may comprise one or more interdependent conditions between two or more of the EAC devices. In certain embodiments, the state machine model is configured wherein each EAC device in the two or more EAC devices comprises a separate finite-state machine, wherein Step 506 is configured to define one or more interdependencies between the separate finite-state machines.

In accordance with certain aspects of the present disclosure, routine 500 may proceed to configure the state machine model by executing one or more steps or operations for configuring two or more states for each EAC device in the plurality of EAC devices (Step 508). In certain embodiments, each state in the two or more states corresponds to an access event and/or lock status for each EAC device in the plurality of EAC devices. Routine 500 may proceed by executing one or more steps or operations for configuring one or more inputs and/or input conditions (i.e., virtual conditions) for each state in the two or more states (Step 510). In certain embodiments, the one or more inputs may comprise one or more EAC codes. The one or more input conditions may comprise one or more interdependencies between one or more of the plurality of EAC devices. In certain embodiments, the one or more input conditions may comprise one or more lockout-tagout conditions for one or more of the plurality of EAC devices. In certain embodiments, an input condition for a first EAC device may comprise a specified state in a second EAC device. Routine 500 may proceed by executing one or more steps or operations for configuring two or more state transitions for each EAC device in the plurality of EAC devices (Step 512). Each state transition may comprise a relationship between a first state and a second state and may include the input and/or input condition(s) necessary to effect the transition between the first state and the second state (and vice versa). Routine 500 may proceed by executing one or more steps or operations for configuring one or more outputs of the state machine model (Step 514). The one or more outputs may comprise one or more output action(s) for each EAC device in the plurality of EAC devices. For example, an output action might comprise actuating a locking mechanism of an EAC device from a locked state to an unlocked state in response to a valid input. Upon completion of steps 504-514, routine 500 may be configured to execute one or more steps or operations for storing the state machine model at the EAC server (e.g., server 104 of FIG. 1 or server 202 of FIG. 2) (Step 516). In certain embodiments, routine 500 may comprise one or more steps or operations for provisioning each EAC device in the plurality of EAC devices according to the state machine model (Step 518). In certain embodiments, routine 500 may comprise one or more steps or operations for providing the EAC code(s) to one or more client devices (e.g., client device 102 of FIG. 1 or client device 204 of FIG. 2) (Step 520).

Figure 6:
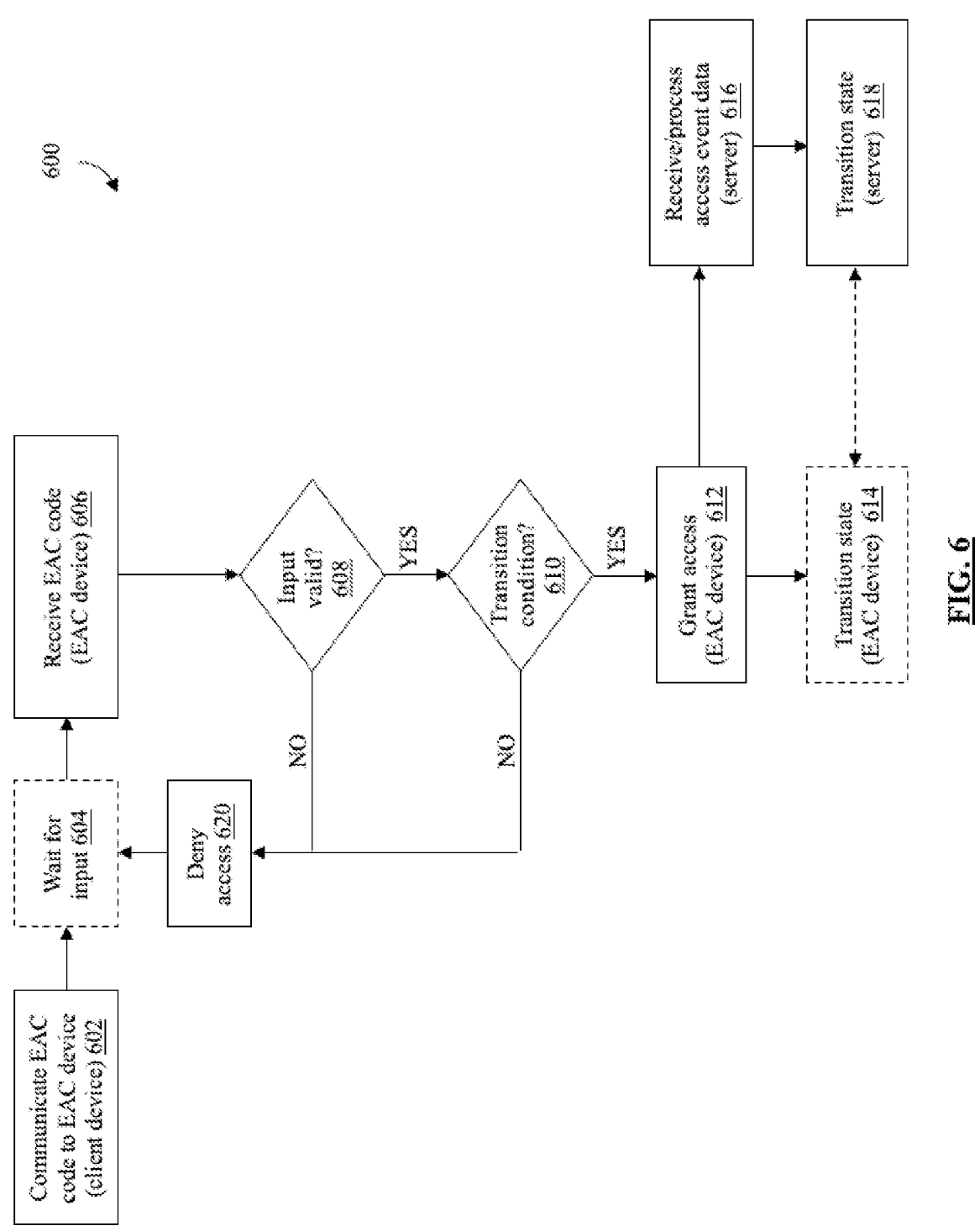
FIG. 6 is a process flow diagram of a routine for processing an access request within a state machine-based electronic access control system.

Referring now to FIG. 6, a process flow diagram of a routine 600 for processing an access request for a first EAC device of a state machine-based electronic access control system is shown. In accordance with certain aspects of the present disclosure, the state machine-based electronic access control system may comprise system 100 of FIG. 1 and/or system 200 of FIG. 2. In accordance with certain aspects of the present disclosure, one or more steps or operations of routine 600 may be configured/executed via state machine engine 108 of FIG. 1 and/or state machine module 218 of FIG. 2. In accordance with certain aspects of the present disclosure, routine 600 may be successive/sequential to routine 500 of FIG. 5 and/or may comprise one or more sub-steps or sub-routines of routine 500 of FIG. 5.

In accordance with certain aspects of the present disclosure, routine 600 may comprise one or more steps or operations for communicating (e.g., with a client device) a first EAC code to a first EAC device (Step 602). In certain embodiments, step 602 may comprise executing one or more operations for configuring an access request for the first EAC device. Said one or more operations may comprise receiving one or more user-generated inputs via a user interface of an EAC application executing on the client device. Step 602 may comprise one or more steps or operations for communicating a wireless signal comprising at least one data packet comprising the first EAC code to the first EAC device via a wireless data transfer interface (e.g., BLUETOOTH). The first EAC device may be configured to wait to receive an input from the client device (step 604) (e.g., send/receive a device advertisement at one or more designated intervals). In accordance with certain embodiments, the EAC device may receive the EAC code from the client device via the wireless data transfer interface (Step 606). Routine 600 may execute one or more of decision steps 608-610 to process the EAC code according to the state machine model. Steps 608-610 may be executed locally via a controller of the EAC device and/or remotely via the EAC server, and/or according to a hybrid thereof. In accordance with certain embodiments, routine 600 may comprise one or more steps or operations for determining whether the EAC code comprises a valid input in the state machine model (Step 608). Step 608 may comprise one or more steps or operations for determining whether the EAC code is a valid/correct code for the EAC device according to the state machine model. If NO, routine 600 may proceed by executing one or more steps or operations to deny the access request (Step 620). Step 620 may comprise one or more operations for communicating a denial of the access request to the client device via the EAC device and/or the EAC server. If YES, routine 600 may proceed by executing one or more steps or operations for determining whether the correct/required transition condition is present for the EAC device according to the state machine model (Step 610). In certain embodiments, step 610 comprises one or more steps or operations for determining a current state of the EAC device and determining whether the input (i.e., the EAC code) comprises a correct/valid input for the current state according to the state machine model. If NO, routine 600 proceeds to step 620 to deny the access request. If YES, routine 600 may execute one or more steps or operations for granting the access request at the EAC device (Step 612). In certain embodiments, step 612 comprises one or more steps or operations for actuating a locking mechanism of the EAC device from a locked state to an unlocked state (e.g., to grant access to an asset secured by the EAC device). In certain embodiments in which a finite-state machine resides locally on the EAC device, routine 600 may comprise one or more steps or operations for transitioning a state from a first state to a second state (Step 614). In certain embodiments, an output of step 612 may comprise communicating access event data from the EAC device to the server. Routine 600 may proceed by executing one or more steps or operations for receiving the access event data at the server and processing the access event data according to the state machine model (Step 616). In accordance with certain aspects of the present disclosure, routine 600 may proceed by executing one or more steps or operations (e.g., via a state machine engine executing on the server) for transitioning the state of the EAC device from a first state to a second state according to the state machine model (Step 618). In certain embodiments, step 618 may comprise one or more steps or operations for effecting a state transition at the EAC device according to the state machine model (Step 614).

Figure 7:
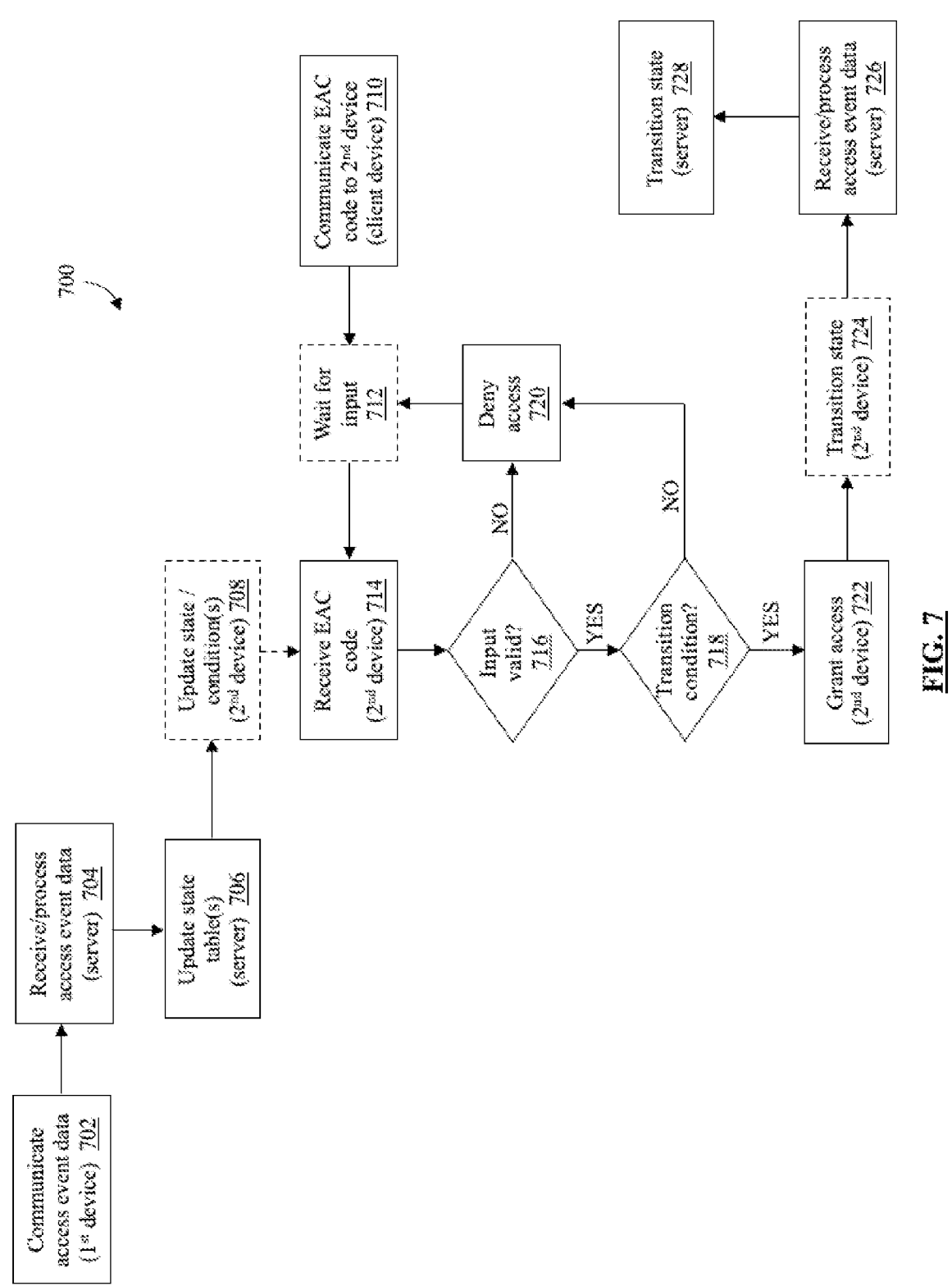
FIG. 7 is a process flow diagram of a routine for processing an access request within a state machine-based electronic access control system.

Referring now to FIG. 7, a process flow diagram of a routine 700 for processing an access request for a second EAC device of a state machine-based electronic access control system is shown. The state machine-based electronic access control system may comprise system 100 of FIG. 1 and/or system 200 of FIG. 2. In accordance with certain aspects of the present disclosure, routine 700 may be successive/sequential to routine 600 of FIG. 6 and/or may comprise one or more sub-steps or sub-routines of routine 600 of FIG. 6. In accordance with certain aspects of the present disclosure, one or more steps or operations of routine 700 may be configured/executed via state machine engine 108 of FIG. 1 and/or state machine module 218 of FIG. 2.

In accordance with certain aspects of the present disclosure, routine 700 may comprise one or more steps or operations for communicating access event data from a first EAC device to the EAC server (Step 702). The EAC server may execute one or more steps or operations to receive and process the access event data (Step 704) and update one or more state table(s) according to the state machine model based on the output of step 704 (Step 706). Step 706 may comprise one or more steps or operations for effecting a state transition and/or updating a virtual condition the first EAC device according to the state machine model. In certain embodiments, routine 700 comprises one or more steps or operations for effecting a state transition and/or updating a virtual condition for a second EAC device according to the state machine model (Step 708).

In accordance with certain aspects of the present disclosure, routine 700 may comprise one or more steps or operations for communicating (e.g., with the client device) an EAC code to a second EAC device (Step 710). The EAC code may comprise the same EAC code as provided to the first EAC device (e.g., in accordance with routine 600 of FIG. 6) or may comprise a second/distinct EAC code from that of the EAC code provided to the first EAC device. In certain embodiments, step 710 may comprise executing one or more operations for configuring an access request for the first EAC device via the user interface of the client device. Step 710 may comprise one or more steps or operations for communicating a wireless signal comprising at least one data packet comprising the EAC code to the second EAC device via a wireless data transfer interface (e.g., BLUETOOTH). The second EAC device may be configured to wait to receive an input from the client device (step 712) (e.g., send/receive a device advertisement at one or more designated intervals).

In accordance with certain embodiments, the second EAC device may receive the EAC code from the client device via the wireless data transfer interface (Step 714). Routine 700 may execute one or more of decision steps 716-718 to process the EAC code according to the state machine model. Steps 716-718 may be executed locally via a controller of the second EAC device and/or remotely via the EAC server, and/or according to a hybrid thereof. In accordance with certain embodiments, routine 700 may comprise one or more steps or operations for determining whether the EAC code comprises a valid input in the state machine model (Step 716). Step 716 may comprise one or more steps or operations for determining whether the EAC code is a valid/correct code for the second EAC device according to the state machine model. If NO, routine 700 may proceed by executing one or more steps or operations to deny the access request (Step 720). Step 720 may comprise one or more operations for communicating a denial of the access request to the client device via the EAC device and/or the EAC server. If YES, routine 700 may proceed by executing one or more steps or operations for determining whether the correct/required transition condition is present for the EAC device according to the state machine model (Step 718). In accordance with certain aspects of the present disclosure, the output of step 718 is dependent on the output of step 708 (i.e., if the state/condition for the second EAC device is not transitioned/updated at step 708, the transition condition will not be satisfied for step 718)—thereby enforcing a sequence of access events between the first EAC device and the second EAC device. In certain embodiments, step 718 comprises one or more steps or operations for determining a current state of the second EAC device and determining whether the input (i.e., the EAC code) comprises a correct/valid input for the current state according to the state machine model. If NO, routine 700 proceeds to step 720 to deny the access request. If YES, routine 700 may execute one or more steps or operations for granting the access request at the second EAC device (Step 722). In certain embodiments, step 722 comprises one or more steps or operations for actuating a locking mechanism of the EAC device from a locked state to an unlocked state (e.g., to grant access to an asset secured by the EAC device).

In certain embodiments in which a finite-state machine resides locally on the second EAC device, routine 700 may comprise one or more steps or operations for transitioning a state from a first state to a second state on the second EAC device (Step 724). Routine 700 may proceed by executing one or more steps or operations for receiving the access event data at the server and processing the access event data according to the state machine model (Step 726). In accordance with certain aspects of the present disclosure, routine 700 may proceed by executing one or more steps or operations (e.g., via the state machine engine executing on the server) for transitioning the state of the second EAC device from a first state to a second state according to the state machine model (Step 728). In certain embodiments, step 728 may comprise one or more steps or operations for effecting a state transition at the second EAC device according to the state machine model.

Figure 8:
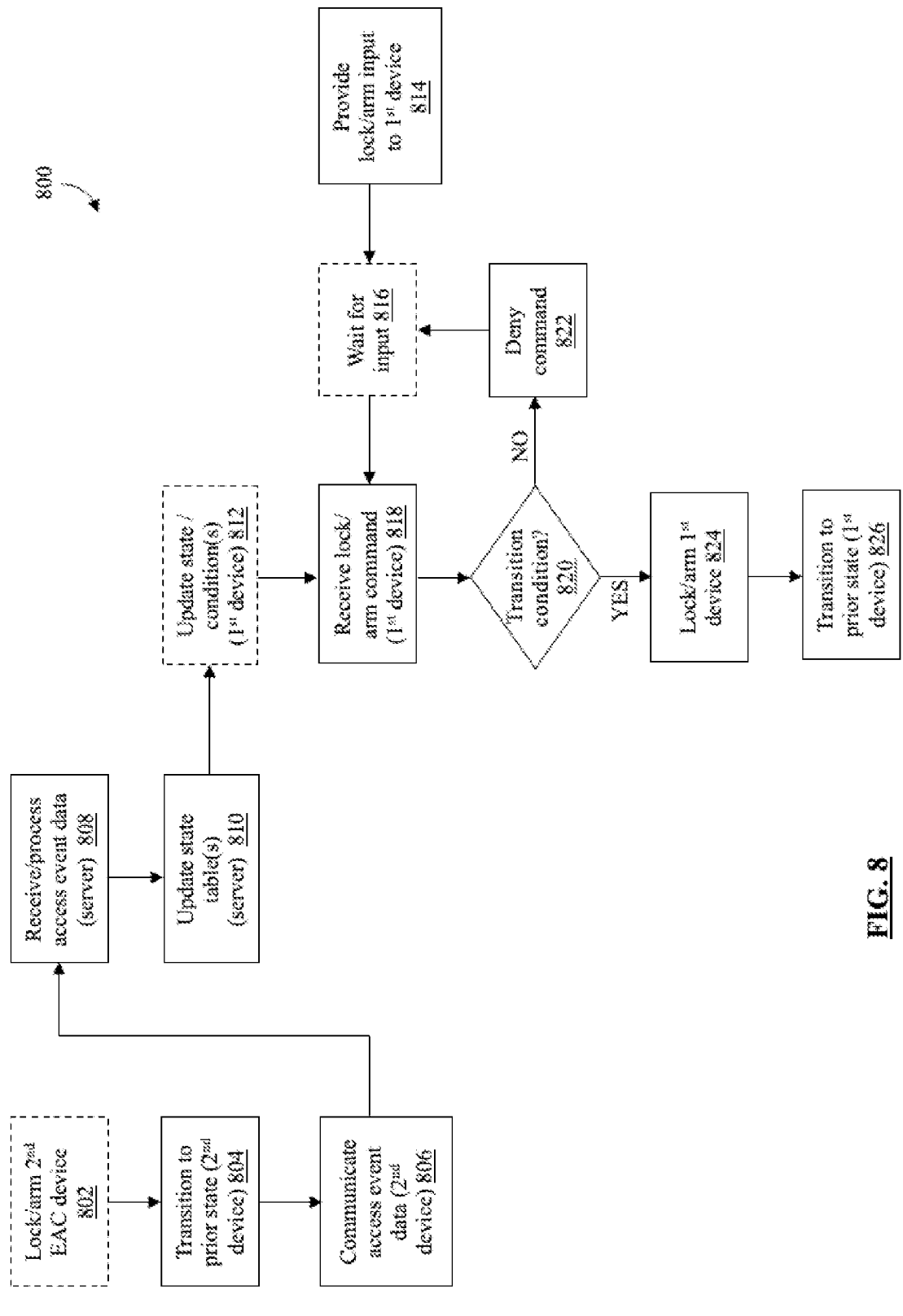
FIG. 8 is a process flow diagram of a routine for effecting at least one interdependent condition between a first EAC device and a second EAC device within a state machine-based electronic access control system.

Referring now to FIG. 8, a process flow diagram of a routine 800 for effecting at least one interdependent condition between a first EAC device and a second EAC device within a state machine-based electronic access control system is shown. The state machine-based electronic access control system may comprise system 100 of FIG. 1 and/or system 200 of FIG. 2. In accordance with certain aspects of the present disclosure, one or more steps or operations of routine 800 may be configured/executed via state machine engine 108 of FIG. 1 and/or state machine module 218 of FIG. 2. In accordance with certain aspects of the present disclosure, routine 800 may be successive/sequential to routine 600 of FIG. 6 and/or routine 700 of FIG. 7 and/or may comprise one or more sub-steps or sub-routines of routine 600 of FIG. 6 and/or routine 700 of FIG. 7.

As shown in FIG. 8, routine 800 may be initiated upon the second EAC device executing a command (e.g., in response to an input from the client device) to lock/arm the second EAC device (i.e., actuating a locking mechanism of the second EAC device from an unlocked state to a locked state) (Step 802). In response to step 802, routine 800 may proceed by executing one or more steps or operations for transitioning a current state of the second EAC device to a prior state of the EAC device (Step 804). In accordance with certain aspects of the present disclosure, the current state of the second EAC device may comprise an output of routine 700 and may be associated with an unlocked state of the second EAC device. In accordance with certain aspects of the present disclosure, routine 800 may proceed by executing one or more steps or operations for communicating access event data (e.g., the output of step 802) from the second EAC device to the server (Step 806). Routine 800 may proceed by executing one or more steps or operations for receiving and processing the access event data at the server (Step 808) and updating one or more state table(s) (e.g., for the first EAC device and the second EAC device) according to the state machine model (Step 810). Routine 800 may proceed by executing one or more steps or operations for effecting a state transition and/or updating a virtual condition for the first EAC device according to the state machine model (Step 812).

In accordance with certain aspects of the present disclosure, routine 800 may comprise one or more steps or operations for providing an input (e.g., via the client device) comprising a lock/arm command to the first EAC device (Step 814). In certain embodiments, the first EAC device may be configured to wait to receive an input from the client device (step 816) via the wireless data transfer interface. In accordance with certain embodiments, the first EAC device may receive the lock/arm command from the client device via the wireless data transfer interface (Step 818). Routine 800 may execute a decision step 820 to process the lock/arm according to the state machine model. Decision step 820 may be executed locally via a controller of the first EAC device and/or remotely via the EAC server, and/or according to a hybrid thereof. In accordance with certain embodiments, routine 800 may proceed by executing one or more steps or operations for determining whether the correct/required transition condition is present for the first EAC device according to the state machine model (Step 820). In accordance with certain aspects of the present disclosure, the output of step 820 is dependent on the output of step 812 (i.e., if the state/condition for the second EAC device is not transitioned/updated at step 812, the transition condition will not be satisfied at step 820)—thereby enforcing a sequence of access events between the second EAC device and the first EAC device. If NO, the correct/required transition condition is not present (i.e., the second EAC device has not been returned to the prior state), then routine 800 proceeds to step 822 to deny the lock/arm command for the first EAC device. If YES, the correct/required transition condition is present (i.e., the second EAC device has been returned to the prior state), routine 800 may execute one or more steps or operations for locking/arming the first EAC device (i.e., actuating a locking mechanism of the first EAC device from an unlocked state to a locked state) (Step 824). In accordance with certain aspects of the present disclosure, routine 800 may comprise one or more steps or operations for transitioning a state of the first EAC device from a current state (e.g., an unlocked state) to a prior state (e.g., a locked state) (Step 826).

Figure 9A:
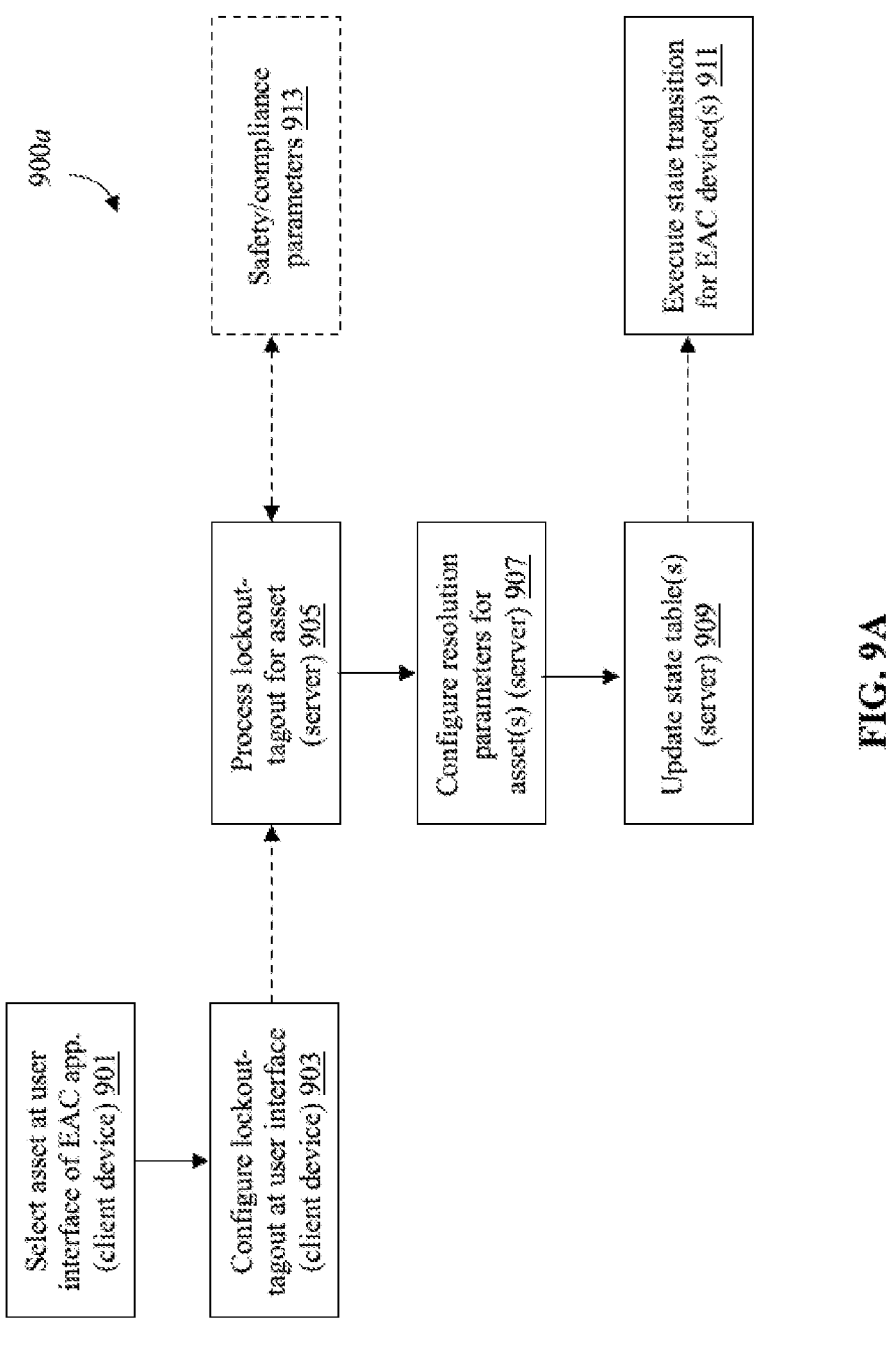
FIG. 9A is a process flow diagram of a routine for configuring a lockout-tagout for at least one asset within a state machine-based electronic access control system.

Referring now to FIG. 9A, a process flow diagram of a routine 900a for configuring a lockout-tagout for at least one asset within a state machine-based electronic access control system is shown. In accordance with certain aspects of the present disclosure, the state machine-based electronic access control system may comprise system 100 of FIG. 1 and/or system 200 of FIG. 2. In accordance with certain aspects of the present disclosure, one or more steps or operations of routine 900a may be configured/executed via state machine engine 108 of FIG. 1 and/or state machine module 218 of FIG. 2.

In accordance with certain aspects of the present disclosure, routine 900a comprises one or more steps or operations 901-913 for effecting a lockout-tagout for at least one asset via a state machine model. In accordance with certain embodiments, routine 900a may comprise one or more steps or operations for selecting an asset to lockout-tagout via a graphical user interface of an EAC application executing on a client device (Step 901). Routine 900a may proceed by executing one or more steps or operations for configuring the lockout-tagout via the graphical user interface (Step 903). Step 903 may include one or more user-generated inputs for configuring the lockout-tagout including, but not limited to, identification of the asset and reasons for the lockout-tagout. Routine 900a may proceed by executing one or more steps or operations for communicating the user-generated inputs to the server and processing the lockout-tagout for the asset at the server (Step 905). In accordance with certain aspects of the present disclosure, routine 900a may be configured to execute one or more steps or operations for assessing one or more safety or compliance parameters, either on an automated basis or in response to the user-generated inputs (Step 913), to process the lockout-tagout for the asset. For example, if an asset requires routine maintenance every six months, routine 900a may be configured to automatically process a lockout-tagout for that asset where routine maintenance data for that asset is absent from the system. Routine 900a may proceed by executing one or more steps or operations for configuring one or more resolution parameters for the lockout-tagout of the asset(s) (Step 907). In accordance with certain aspects of the present disclosure, the one or more resolution parameters may comprise one or more procedures in accordance with OSHA standard for The Control of Hazardous Energy (Lockout/ Tagout), Title 29 Code of Federal Regulations (CFR) Part 1910.147. Routine 900a may proceed by executing one or more steps or operations for updating one or more state tables in the state machine model according to the one or more resolution parameters (Step 909). In accordance with certain aspects of the present disclosure, each parameter in the one or more resolution parameters may comprise an input and/or a virtual condition in the state machine model. Routine 900a may proceed by executing one or more steps or operations for effecting a state transition for one or more EAC devices that are associated with the locked-out asset (Step 911). In accordance with certain aspects of the present disclosure, the state transition for the one or more EAC devices may disable at least one EAC code for the one or more EAC devices according to the state machine model.

Figure 9B:
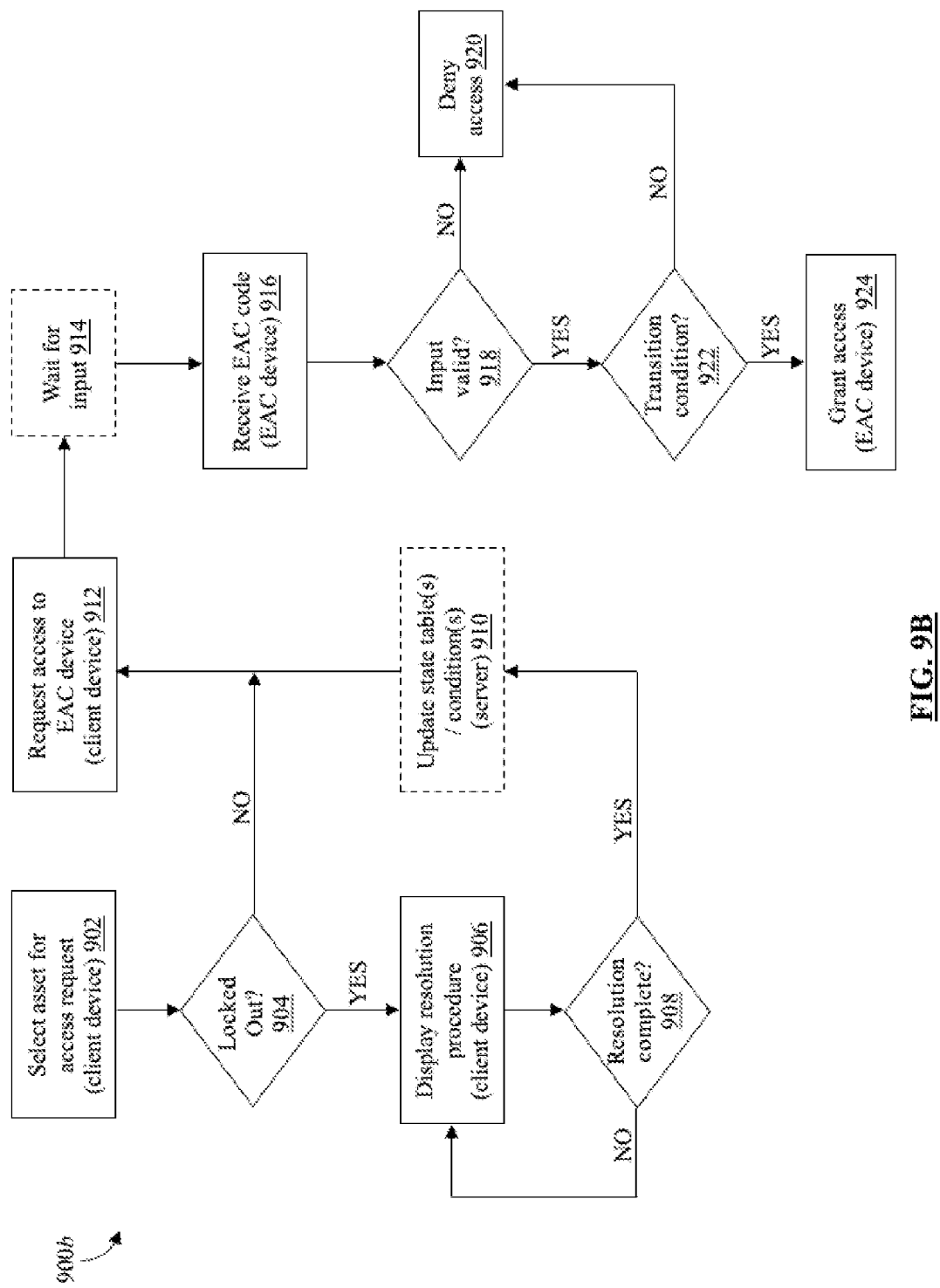
FIG. 9B is a process flow diagram of a routine for resolving a lockout-tagout for at least one asset within a state machine-based electronic access control system.

Referring now to FIG. 9B, a process flow diagram of a routine 900b for resolving a lockout-tagout for at least one asset within a state machine-based electronic access control system is shown. In accordance with certain aspects of the present disclosure, the state machine-based electronic access control system may comprise system 100 of FIG. 1 and/or system 200 of FIG. 2. In accordance with certain aspects of the present disclosure, one or more steps or operations of routine 900b may be configured/executed via state machine engine 108 of FIG. 1 and/or state machine module 218 of FIG. 2. In accordance with certain aspects of the present disclosure, routine 900b is successive/sequential to routine 900a and/or may comprise one or more sub-steps or sub-routines of routine 900a.

In accordance with certain aspects of the present disclosure, routine 900b comprises one or more steps or operations 902-924 for processing an access request for at least one EAC device. In accordance with certain embodiments, routine 900b may comprise one or more steps or operations for selecting an asset for an access request according to a user-generated input via a graphical user interface of an EAC application executing on a client device (Step 902). The EAC application may be configured to execute one or more steps or operations to determine whether the selected asset comprises a locked-out/tagged-out asset (Step 904). If NO, the selected asset is not a locked-out/tagged-out asset, routine 900b proceeds to step 912 to process an access request for the selected asset. If YES, the selected asset is a locked-out/tagged-out asset, routine 900b proceeds by executing one or more steps or operations for displaying a resolution procedure for the locked-out/tagged-out asset at the graphical user interface of the EAC application (Step 906). In accordance with certain aspects of the present disclosure, step 906 comprises one or more steps or operations for receiving one or more user-generated inputs to verify the completion of one or more steps of the resolution procedure for the locked-out/tagged-out asset. Routine 900b may comprise one or more steps or operations for determining whether the resolution procedure for the locked-out/tagged-out asset is complete (Step 908). If NO, the EAC application may continue to display/prompt the resolution procedure for the locked-out/tagged-out asset in response to the access request for the locked-out/tagged-out asset. If YES, routine 900b may execute one or more steps or operations for updating the one or more state tables in the state machine model according to one or more resolution completion inputs (Step 910). In accordance with certain aspects of the present disclosure, the one or more resolution completion inputs comprise one or more inputs in the state machine model.

In accordance with certain aspects of the present disclosure, routine 900b may proceed by executing one or more steps or operations for communicating an access request via the client device to the selected EAC device (Step 912). The selected EAC device may be configured to wait to receive an input from the client device (step 914) (e.g., send/receive a device advertisement at one or more designated intervals). In accordance with certain embodiments, the selected EAC device may receive the EAC code from the client device via the wireless data transfer interface (Step 916). Routine 900b may execute one or more of decision steps 918-922 to process the EAC code according to the state machine model. In accordance with certain embodiments, routine 900b may comprise one or more steps or operations for determining whether the EAC code comprises a valid input in the state machine model (Step 918). Step 918 may comprise one or more steps or operations for determining whether the EAC code is a valid/correct code for the selected EAC device according to the state machine model. If NO, routine 900b may proceed by executing one or more steps or operations for denying the access request (Step 920). Step 920 may comprise one or more operations for communicating a denial of the access request to the client device via the EAC device and/or the EAC server. If YES, routine 900b may proceed by executing one or more steps or operations for determining whether the correct/required transition condition is present for the selected EAC device according to the state machine model (Step 922). If NO, routine 900b proceeds to step 920 to deny the access request. If YES, routine 900b may execute one or more steps or operations for granting the access request at the selected EAC device (Step 924). In certain embodiments, step 924 comprises one or more steps or operations for actuating a locking mechanism of the selected EAC device from a locked state to an unlocked state (e.g., to grant access to the asset secured by the selected EAC device).

Figure 10:
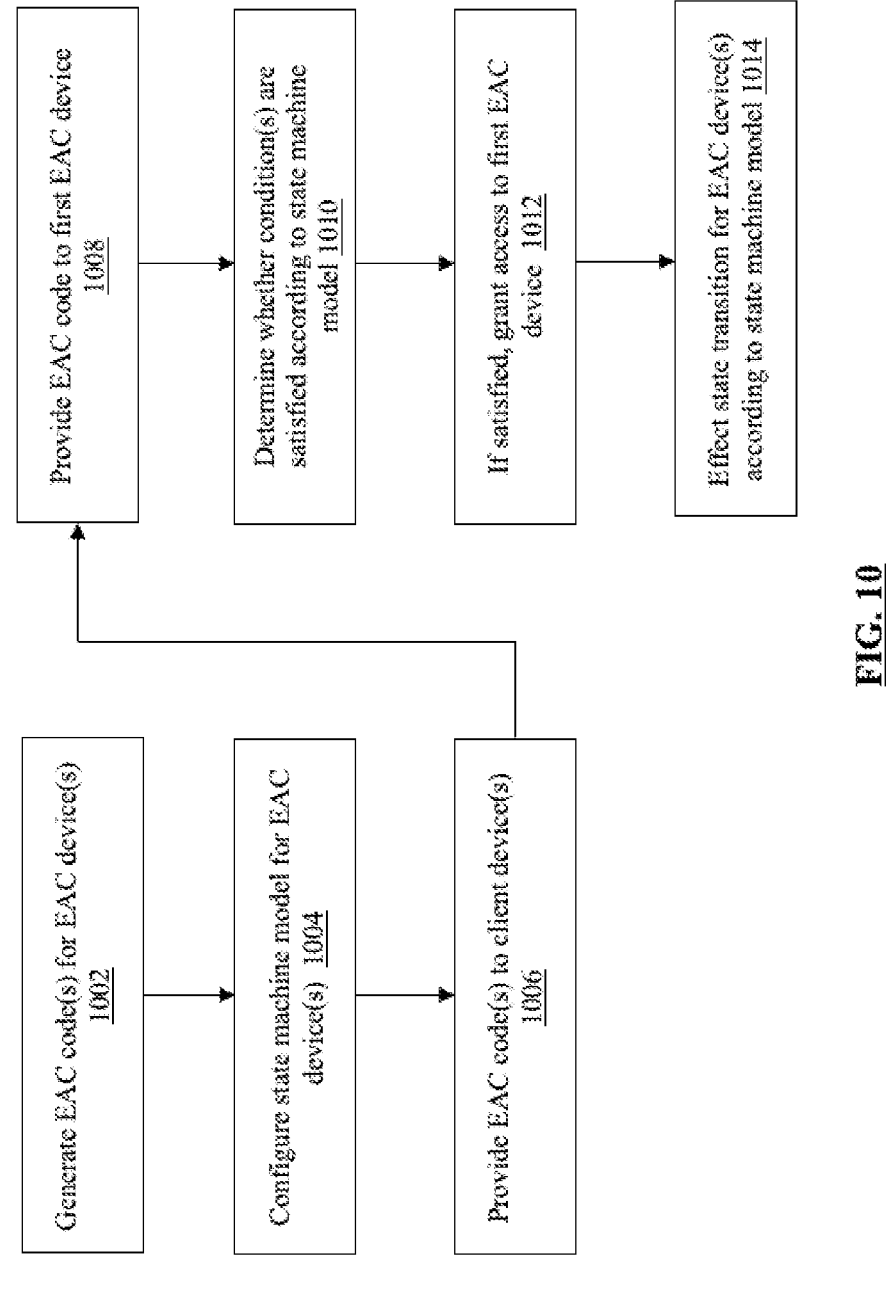
FIG. 10 is a process flow diagram of a state machine-based electronic access control method, in accordance with certain aspects of the present disclosure.

Referring now to FIG. 10, a process flow diagram of a state machine-based electronic access control method 1000 is shown. In accordance with certain aspects of the present disclosure, method 1000 may comprise one or more steps or operations for generating (e.g., with at least one processor) at least one electronic access control code associated with one or more electronic access control devices (Step 1002). In certain embodiments, the one or more electronic access control devices are configured to selectively grant or restrict access to at least one asset at an access-controlled site. Method 1000 may proceed by executing one or more steps or operations for configuring (e.g., with the at least one processor) a state machine model for the one or more electronic access control devices (Step 1004). In certain embodiments, the state machine model comprises one or more states, each state in the one or more states corresponding to a lock status for each device in the one or more electronic access control devices. In certain embodiments, the state machine model is configured to configure at least one condition for the at least one electronic access control code according to the one or more states. Method 1000 may proceed by executing one or more steps or operations for providing (e.g., with the at least one processor) the at least one electronic access control code to a client device (Step 1006). Method 1000 may proceed by executing one or more steps or operations for providing (e.g., with the client device) the at least one electronic access control code to a first device in the one or more electronic access control devices via a data transfer interface between the client device and the first device (Step 1008). Method 1000 may proceed by executing one or more steps or operations for determining whether the at least one condition for the at least one electronic access control code is satisfied according to the state machine model (Step 1010) and granting access to the first device in response to determining the at least one condition for the at least one electronic access control code is satisfied (Step 1012). In response to granting access to the first device, method 1000 may proceed by executing one or more steps or operations for effecting (e.g., with the at least one processor) at least one state transition for the one or more electronic access control devices according to the state machine model (Step 1014).

In accordance with certain aspects of the present disclosure, method 1000 may further comprise one or more steps or operations for providing (e.g., with the client device) the at least one electronic access control code to a second device in the one or more electronic access control devices. Method 1000 may further comprise one or more steps or operations for determining whether the at least one condition for the at least one electronic access control code is satisfied in response to the at least one state transition. Method 1000 may further comprise granting access to the second device in response to determining the at least one condition for the at least one electronic access control code is satisfied or denying access to the second device in response to determining the at least one condition for the at least one electronic access control code is not satisfied. Method 1000 may further comprise one or more steps or operations for receiving (e.g., with the client device) at least one user-generated input comprising safety or compliance data corresponding to the at least one asset. In certain embodiments, method 1000 may further comprise one or more steps or operations for effecting (e.g., with the at least one processor) at least one second state transition for the one or more electronic access control devices according to the state machine model in response to the safety or compliance data. In certain embodiments, method 1000 may further comprise one or more steps or operations for effecting (e.g., with the at least one processor) at least one second state transition for the one or more electronic access control devices according to the state machine model in response to granting access to the second device.

Figure 11:
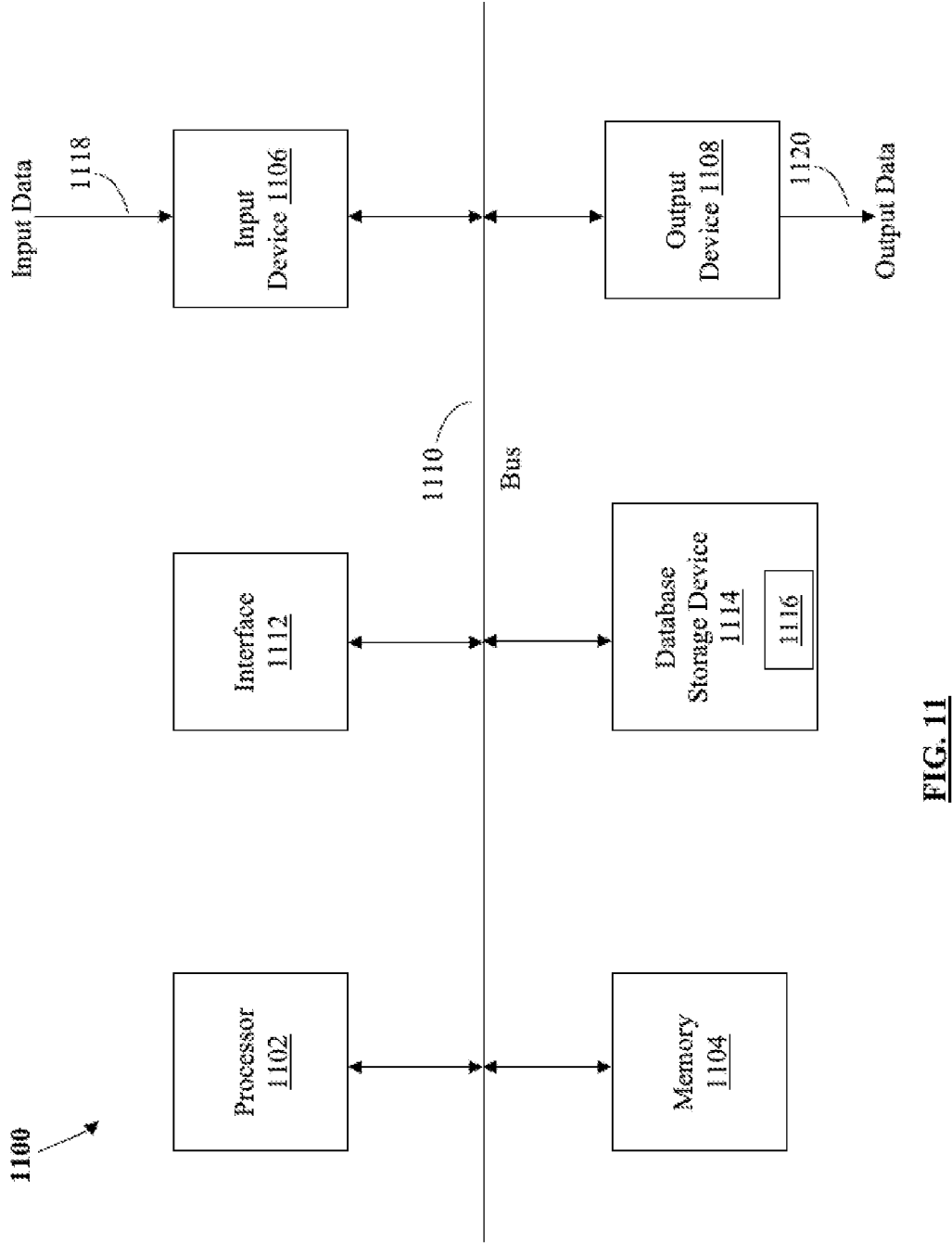
FIG. 11 is an illustrative embodiment of a computing device through which one or more aspects of the present disclosure may be implemented.

Referring now to FIG. 11, a processing system 1100 in which one or more aspects of the present disclosure may be implemented is shown. For example, processing system 1100 may comprise one or more devices and systems of the present disclosure including, but not limited to, one or more mobile electronic device, server, alarm system controller, electronic access controller, electronic access control system interface, and the like. According to an embodiment, processing system 1100 may generally comprise at least one processor 1102, or processing unit or plurality of processors, a memory 1104, at least one input device 1106 and at least one output device 1108, coupled together via a bus or group of buses 1110. In certain embodiments, input device 1106 and output device 1108 could be the same device. An interface 1112 can also be provided for coupling the processing system 1100 to one or more peripheral devices; for example, interface 1112 could be a PCI card or PC card. At least one storage device 1114 which houses at least one database 1116 can also be provided. The memory 1104 can be any form of memory device, for example, volatile or non-volatile memory, solid state storage devices, magnetic devices, etc. The processor 1102 could comprise more than one distinct processing device, for example to handle different functions within the processing system 1100. Input device 1106 receives input data 1118 and can comprise, for example, a keyboard, a pointer device such as a pen-like device or a mouse, audio receiving device for voice-controlled activation such as a microphone, data receiver or antenna (e.g., radio frequency transceiver), a modem or wireless data adaptor, data acquisition card, etc. Input data 1118 could come from different sources, for example keyboard instructions in conjunction with data received via a network. Output device 1108 produces or generates output data 1120 and can comprise, for example, a display device or monitor in which case output data 1120 is visual, a printer in which case output data 1120 is printed, a port for example a USB port, a peripheral component adaptor, a data transmitter or antenna such as a modem or wireless network adaptor, BLUETOOTH, NFC, RFID, LoRA, etc. Output data 1120 could be distinct and derived from different output devices, for example a visual display on a monitor in conjunction with data transmitted to a network. A user could view data output, or an interpretation of the data output, on, for example, a monitor or using a printer. The storage device 1114 can be any form of data or information storage means, for example, volatile or non-volatile memory, solid state storage devices, magnetic devices, etc.

In use, the processing system 1100 is adapted to allow data or information to be stored in and/or retrieved from, via wired or wireless communication means, at least one database 1116. The interface 1112 may allow wired and/or wireless communication between the processing unit 1102 and peripheral components that may serve a specialized purpose. In general, the processor 1102 can receive instructions as input data 1118 via input device 1106 and can display processed results or other output to a user by utilizing output device 1108. More than one input device 1106 and/or output device 1108 can be provided. It should be appreciated that the processing system 1100 may be any form of terminal, server, specialized hardware, or the like.

It is to be appreciated that the processing system 1100 may be a part of a networked communications system. Processing system 1100 could connect to a network, for example the Internet or a WAN. Input data 1118 and output data 1120 could be communicated to other devices via the network. The transfer of information and/or data over the network can be achieved using wired communications means or wireless communications means. A server can facilitate the transfer of data between the network and one or more databases. A server and one or more databases provide an example of an information source.

Thus, the processing computing system environment 1100 illustrated in FIG. 11 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 11 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the computing system environment 1100 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 1100, or portions thereof, may be stored in a remote memory storage device. It is to be appreciated that the illustrated network connections of FIG. 11 are exemplary and other means of establishing a communications link between multiple computers may be used.

FIG. 11 is intended to provide a brief, general description of an illustrative and/or suitable exemplary environment in which embodiments of the below described present invention may be implemented. FIG. 11 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

As provided in the foregoing detailed description of the several views of the drawings, certain embodiments have been described with reference to acts and symbolic representations of operations that are performed by one or more computing devices, such as the computing system environment 1100 of FIG. 11. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations, including, but not limited to, those provided herein. Examples of well-known computing systems, environments, and configurations that may be suitable for use with an embodiment include, but are not limited to, smart phones, tablet computers, electronic access control devices, personal computers, handheld or laptop devices, personal digital assistants, multiprocessor systems, microprocessor-based systems, set top boxes, programmable consumer electronics, network, minicomputers, server computers, electronic access control server computers, alarm system server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

EXEMPLARY USE CASES

Example 1: Cabinet Site with Two or More Cabinets

In accordance with an exemplary use case, a wireless lockout-tagout state machine-based access control system may be implemented within an access-controlled site comprising one or more EAC devices configured to secure one or more assets including, for example, at least one power/battery cabinet and one or more (e.g., between one and five) additional cabinets with digital radios and fiber management devices. The power cabinet may be configured to feed all other cabinets −48 VDC while in operation. The additional cabinets may comprise a hybrid cable with fiber and DC power configured to feed a remote radio head (RRH) on a tower. In some cases, these cabinets may comprise RF coaxial cables feeding directly to antennas nearby on a rooftop or tower. In accordance with certain aspects of the present disclosure, the wireless lockout-tagout state machine-based access control system may comprise one or more tagout scenarios for invoking a state change for the one or more EAC devices configured to secure the one or more assets. In accordance with the exemplary use case, the one or more tagout scenarios may include:

i. If a cabinet is being added or an existing cabinet requires an upgrade or disconnection of the DC power feeding the cabinet.

ii. If a tower crew is changing out an RRH (e.g., DC power & fiber feed to the RRH).

iii. If a tower crew is changing out an antenna.

iv. In response to one or more elements/protocols of a Tower Safety Climb.

Example 2: Central Data Center/Switch Room

In accordance with an exemplary use case, a wireless lockout-tagout state machine-based access control system may be implemented within an access-controlled site comprising a central data center and/or switch room having one or more EAC devices configured to secure one or more access points thereof. In accordance with certain aspects of the present disclosure, the wireless lockout-tagout state machine-based access control system may comprise one or more tagout scenarios for invoking one or more state change for the one or more EAC devices according to a state machine model. In accordance with the exemplary use case, the one or more tagout scenarios may include:

i. One or more security protocols or parameters for accessing a high current DC power frame (e.g., <400 VDC).

ii. One or more security protocols or parameters for arc flash protection within a high voltage enclosure.

Example 3: Edge Data Centers (Kinetic Edge Computing)

In accordance with an exemplary use case, a wireless lockout-tagout state machine-based access control system may be implemented within an access-controlled site comprising an edge data center having one or more EAC devices configured to secure one or more access points thereof. In accordance with certain aspects of the present disclosure, the wireless lockout-tagout state machine-based access control system may comprise one or more tagout scenarios for invoking one or more state change for the one or more EAC devices according to a state machine model. In accordance with the exemplary use case, the one or more tagout scenarios may include:

i. One or more user permissions or authentications configured to allow and verify only qualified, trusted people to access a common server frame.

ii. One or more access protocols or parameters for a DC power plant door or frame.

As will be appreciated by one of skill in the art, one or more aspects of the present disclosure may be embodied as a method (including, for example, a computer-implemented process, a system routine, and/or any other process), an apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random-access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be performed in an order other than the order illustrated, may be combined or divided, or may be performed simultaneously. It will also be understood that the blocks of the block diagrams illustrate, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While certain exemplary embodiments have been described and shown in the accompanying drawings, it is to be understood that such embodiments are merely illustrative of, and not restrictive on, the broad invention, and that this invention is not limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An electronic access control method comprising:

generating, with at least one processor, at least one electronic access control code associated with one or more electronic access control devices;

configuring, with the at least one processor, a state machine model for the one or more electronic access control devices, wherein the at least one electronic access control code comprises at least one input in the state machine model, wherein the state machine model comprises one or more states, each state in the one or more states corresponding to a status of the one or more electronic access control devices;

providing, with the at least one processor, the at least one electronic access control code to a client device;

providing, with the client device, the at least one electronic access control code to a first electronic access control device;

receiving, with the at least one processor, access event data for the first electronic access control device;

in response to the access event data, effecting, with the at least one processor, at least one state transition in the state machine model; and based on the at least one state transition, enabling the at least one electronic access control code to unlock a second electronic access control device.

2. The electronic access control method of claim 1 wherein the state machine model is configured to configure at least one condition for the at least one electronic access control code according to the one or more states.

3. The electronic access control method of claim 2 further comprising determining whether the at least one condition for the at least one electronic access control code is satisfied in response to the at least one state transition.

4. The electronic access control method of claim 3 further comprising granting access to the second electronic access control device in response to determining the at least one condition for the at least one electronic access control code is satisfied or denying access to the second electronic access control device in response to determining the at least one condition for the at least one electronic access control code is not satisfied.

5. The electronic access control method of claim 1 further comprising receiving, with the client device, at least one user-generated input comprising safety or compliance data corresponding to at least one asset at an access-controlled site.

6. The electronic access control method of claim 5 further comprising effecting, with the at least one processor, at least one second state transition for the one or more electronic access control devices according to the state machine model in response to the safety or compliance data.

7. The electronic access control method of claim 4 further comprising effecting, with the at least one processor, at least one second state transition for the one or more electronic access control devices according to the state machine model in response to granting access to the second electronic access control device.

8. An electronic access control system comprising:

a processor; and a non-transitory computer readable medium communicably engaged with the processor and comprising instructions stored thereon that, when executed, command the processor to perform one or more operations, the one or more operations comprising:

generating at least one electronic access control code associated with one or more electronic access control devices, wherein the one or more electronic access control devices are configured to selectively grant or restrict access to at least one asset at an access-controlled site;

configuring a state machine model for the one or more electronic access control devices, wherein the at least one electronic access control code comprises at least one input in the state machine model, wherein the state machine model comprises one or more states, each state in the one or more states corresponding to a status of the one or more electronic access control devices, wherein the state machine model is configured to configure at least one condition for the at least one electronic access control code according to the one or more states;

providing the at least one electronic access control code to a client device, wherein the at least one electronic access control code is configured to unlock a first device in the one or more electronic access control devices according to the state machine model;

receiving access event data for the first device in the one or more electronic access control devices; and effecting at least one state transition in the state machine model in response to the access event data for the first device, wherein the state machine model is configured to enable the at least one electronic access control code to unlock at least one second device in the one or more electronic access control devices based on the at least one state transition.

9. The electronic access control system of claim 8 wherein the one or more operations further comprise receiving access event data for the at least one second device.

10. The electronic access control system of claim 9 wherein the one or more operations further comprise effecting at least one second state transition in the state machine model in response to the access event data for the at least one second device, wherein the at least one second state transition comprises a return to a prior state or a transition to a sequential state in the state machine model.

11. The electronic access control system of claim 8 wherein the one or more operations further comprise receiving safety or compliance data associated with the at least one asset.

12. The electronic access control system of claim 11 wherein the one or more operations further comprise processing the safety or compliance data according to the state machine model, wherein the state machine model is configured to effect at least one second state transition in response to the safety or compliance data.

13. The electronic access control system of claim 12 wherein the state machine model is configured to disable the at least one electronic access control code for at least one device in the one or more electronic access control devices in response to the at least one second state transition.

* * * * *